United States Patent
Lee et al.

(10) Patent No.: US 10,554,359 B2
(45) Date of Patent: Feb. 4, 2020

(54) METHOD OF RECEIVING PHASE TRACKING REFERENCE SIGNAL BY USER EQUIPMENT IN WIRELESS COMMUNICATION SYSTEM AND DEVICE FOR SUPPORTING SAME

(71) Applicant: LG ELECTRONICS INC., Seoul (KR)

(72) Inventors: Kilbom Lee, Seoul (KR); Jiwon Kang, Seoul (KR); Kyuseok Kim, Seoul (KR); Kijun Kim, Seoul (KR); Kunil Yum, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/252,142

(22) Filed: Jan. 18, 2019

(65) Prior Publication Data

US 2019/0165910 A1 May 30, 2019

Related U.S. Application Data

(63) Continuation of application No. 16/077,325, filed as application No. PCT/KR2018/003505 on Mar. 26, 2018.

(Continued)

(51) Int. Cl.
*H04L 5/00* (2006.01)
*H04L 1/00* (2006.01)

(52) U.S. Cl.
CPC .......... *H04L 5/0048* (2013.01); *H04L 1/0011* (2013.01); *H04L 1/0027* (2013.01)

(58) Field of Classification Search
CPC .. H04L 5/0048; H04L 5/0098; H04L 27/2602
See application file for complete search history.

(56) References Cited

U.S. PATENT DOCUMENTS

| 2009/0125793 A1* | 5/2009 | Kishigami | ............. H04L 1/005 |
| | | | 714/794 |
| 2010/0006594 A1 | 1/2010 | Mauger et al. | |

(Continued)

FOREIGN PATENT DOCUMENTS

| KR | 10-2011-0026399 A | 3/2011 |
| KR | 10-2013-0143618 A | 12/2013 |

(Continued)

OTHER PUBLICATIONS

"WF on PTRS position for CP-OFDM," R1-1709502, 3GPP TSG RAN WG1 Meeting #89, Hangzhou, China, May 15-19, 2017, 3 pages.

(Continued)

*Primary Examiner* — Melanie Jagannathan
(74) *Attorney, Agent, or Firm* — Fish & Richardson P.C.

(57) ABSTRACT

A method of receiving phase tracking reference signal (PT-RS) by a user equipment (UE) in a wireless communication system, the method includes determining one or more resource blocks to which the PT-RS is mapped among N resource blocks allocated to the UE; and receiving the PT-RS via the one or more second resource blocks, wherein the N resource blocks are indexed as second resource block indices 0 to N−1 from a resource block having a lowest index of first resource block indices to a resource block having a highest index of the first resource block indices, wherein the PT-RS is mapped to the one or more resource blocks having indices of the second resource block indices and the indices are determined based on a first value related to a frequency density of the PT-RS and a second value related to a resource block offset, wherein the first value is determined based on a scheduled bandwidth related with the N resource blocks allocated to the UE, and wherein N is a natural number.

18 Claims, 24 Drawing Sheets

Related U.S. Application Data

(60) Provisional application No. 62/619,123, filed on Jan. 19, 2018, provisional application No. 62/565,161, filed on Sep. 29, 2017, provisional application No. 62/555,020, filed on Sep. 6, 2017, provisional application No. 62/520,666, filed on Jun. 16, 2017, provisional application No. 62/476,744, filed on Mar. 25, 2017.

(56) References Cited

U.S. PATENT DOCUMENTS

| | | | |
|---|---|---|---|
| 2012/0020323 A1* | 1/2012 | Noh | H04J 13/00 370/330 |
| 2013/0188566 A1* | 7/2013 | Zhu | H04W 72/042 370/329 |
| 2014/0321406 A1* | 10/2014 | Marinier | H04B 7/024 370/329 |
| 2017/0048086 A1 | 2/2017 | Subramanian et al. | |
| 2018/0124796 A1* | 5/2018 | Noh | H04B 1/1027 |
| 2018/0227929 A1* | 8/2018 | Yoo | H04L 5/005 |
| 2018/0367277 A1* | 12/2018 | Zhang | H04L 5/0048 |
| 2019/0081844 A1* | 3/2019 | Lee | H04L 5/00 |

FOREIGN PATENT DOCUMENTS

| | | |
|---|---|---|
| KR | 10-2016-0013871 A | 2/2016 |
| KR | 10-1603115 B1 | 3/2016 |
| KR | 10-1683120 B1 | 12/2016 |

OTHER PUBLICATIONS

"WF on PTRS for CP-OFDM," R1-1709521, 3GPP TSG RAN WG1 #89, Hangzhou, China, May 15-19, 2017, 7 pages.
"LTE; Evolved Universal Terrestrial Radio Access (E-UTRA); Physical layer procedures (3GPP TS 36.213 version 12.5.0 Release 12)," ETSI TS 136 213 V12.5.0 (Apr. 2015), 242 pages.
CMCC, "Phase-Tracking Reference Signal Design for High-Frequency Systems," 3GPP TSG RAN WG1 Meeting #88, R1-1703406, Athens, Greece, Feb. 13-17, 2017, pp. 1-11 (12 pages total).
Ericsson, "On DL and UL phase noise tracking RS (PTRS)," 3GPP TSG-RAN WG1 #87ah-NR, R1-1701161, Spokane, WA, USA, Jan. 16-20, 2017, pp. 1-9 (10 pages total).
Intel Corporation, "On RS for Phase Tracking," 3GPP TSG-RAN WG1 #88, R1-1702213, Athens, Greece, Feb. 13-17, 2017, pp. 1-4.
LG Electronics, "Discussion on Phase Tracking RS for DL," 3GPP TSG RAN WG1 Meeting #88, R1-1702463, Athens, Greece, Feb. 13-17, 2017, pp. 1-5.
National Instruments, "Discussion on Signaling for PT-RS," 3GPP TSG RAN WG1 Meeting #88bis, R1-1705253, Spokane, USA, Apr. 3-7, 2017, pp. 1-10 (11 pages total).
Qualcomm Incorporated, "Phase and frequency tracking reference signal considerations," 3GPP TSG-RAN WG1 #87AH, R1-1700808, Spokane, USA, Jan. 16-20, 2017, pp. 1-7 (8 pages total).
ZTE et al., "Discussion on downlink DMRS design," 3GPP TSG RAN WG1 NR Ad-Hoc Meeting, R1-1700135, Spokane, USA, Jan. 16-20, 2017, 10 pages.
ZTE, ZTE Microelectronics, "Discussion on RS for phase tracking," R1-1701817, 3GPP TSG RAN WG1 Meeting #88, Athens, Greece, Feb. 13-17, 2017, 9 pages.
Nokia, Alcatel-Lucent Shanghai Bell, "On the PTRS design for NR," R1-1701105, 3GPP TSG RAN WG1 NR Ad-Hoc Meeting, Spokane, USA, Jan. 16-20, 2017, 16 pages.
Nokia, Alcatel-Lucent Shanghai Bell, "On PT-RS Design for NR," R1-1703182, 3GPP TSG RAN WG1#88, Athens, Greece, Feb. 13-17, 2017, 7 pages.
Panasonic, "PT-RS port association and indication," R1-1705160, 3GPP TSG RAN WG1 Meeting #88bis, Spokane, US, Apr. 3-7, 2017, 5 pages.
NTT Docomo, Inc., "Views on RS for phase tracking," R1-1612720, 3GPP TSG RAN WG1 Meeting #87, Reno, USA, Nov. 14-18, 2016, 5 pages.

* cited by examiner

METHOD OF RECEIVING PHASE TRACKING REFERENCE SIGNAL BY USER EQUIPMENT IN WIRELESS COMMUNICATION SYSTEM AND DEVICE FOR SUPPORTING SAME

CROSS REFERENCE TO RELATED APPLICATIONS

This application is a Continuation of U.S. patent application Ser. No. 16/077,325, filed on Aug. 10, 2018, which is the National Phase of PCT International Application No. PCT/KR2018/003505, filed on Mar. 26, 2018, which claims priority under 35 U.S.C. 119(e) to U.S. Provisional Application No. 62/476,744, filed on Mar. 25, 2017, U.S. Provisional Application No. 62/520,666, filed on Jun. 16, 2017, U.S. Provisional Application No. 62/555,020, filed on Sep. 6, 2017, U.S. Provisional Application No. 62/565,161, filed on Sep. 29, 2017 and U.S. Provisional Application No. 62/619,123, filed on Jan. 19, 2018, all of which are hereby expressly incorporated by reference into the present application.

BACKGROUND OF THE INVENTION

Technical Field

The present invention relates to a wireless communication system, and more particularly, to a method of receiving a phase tracking reference signal by a user equipment in a wireless communication system and device for supporting the same.

Discussion of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

SUMMARY OF THE INVENTION

The object of the present invention is to provide a method of receiving a phase tracking reference signal by a user equipment in a wireless communication system and devices for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

The present invention provides a method of receiving a phase tracking reference signal (PT-RS) by a user equipment in a wireless communication system and devices for supporting the same.

In an aspect of the present invention, provided herein is a method of receiving a phase tracking reference signal (PT-RS) by a user equipment (UE) in a wireless communication system, including: determining PT-RS frequency density based on bandwidth allocated to the UE; and receiving the PT-RS on a resource block that is determined based on new resource block indices for all resource blocks, which are allocated to the UE, and the determined PT-RS frequency density.

In another aspect of the present invention, provided herein is a user equipment (UE) for receiving a phase tracking reference signal (PT-RS) in a wireless communication system, including: a receiver; and a processor connected to the receiver, wherein the processor may be configured to: determine PT-RS frequency density based on bandwidth allocated to the UE; and receive the PT-RS on a resource block that is determined based on new resource block indices for all resource blocks, which are allocated to the UE, and the determined PT-RS frequency density.

In this configuration, the PT-RS frequency density may be determined as either one PT-RS every two resource blocks or one PT-RS every four resource blocks.

In addition, in this configuration, the new resource block indices for all resource blocks allocated to the UE may correspond to virtual resource block indices for all resource blocks allocated to the UE. In this case, the virtual resource block indices may be numbered in the same order as that of indices of all resource blocks allocated to the UE.

Moreover, in this configuration, the UE may receive information indicating one or a plurality of subcarriers to which the PT-RS can be mapped in a resource block to which the PT-RS is mapped.

At this time, the UE may determine a location of at least one subcarriers where the PT-RS is mapped among the one or plurality of subcarriers based on a frequency location of a demodulation reference signal (DM-RS) port associated with the PT-RS.

In this case, the information may be received through higher layer signaling.

Additionally, the PT-RS may be mapped to at least one symbol after a symbol to which the associated DM-RS port is mapped within the at least one subcarrier to which the PT-RS is mapped and then received.

In this case, a time-domain pattern for mapping the PT-RS to the at least one symbol may be determined based on a modulation and coding scheme (MCS) scheduled to the UE.

When PT-RSs are received through two PT-RS ports and when the two PT-RS ports are respectively associated with a plurality of demodulation reference signal (DM-RS) ports, which are code division multiplexed in a time domain (CDM-T), the PT-RSs to pass through the two PT-RS ports may be mapped to different resource blocks and then received.

It is to be understood that both the foregoing general description and the following detailed description of the present disclosure are exemplary and explanatory and are intended to provide further explanation of the disclosure as claimed.

As is apparent from the above description, the embodiments of the present disclosure have the following effects.

According to the present invention, a UE can receive a PTRS by avoiding a collision with other reference signals in a wireless communication system to which the present invention is applicable.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

BRIEF DESCRIPTION OF THE DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

DETAILED DESCRIPTION OF THE EMBODIMENTS

Figure 1:
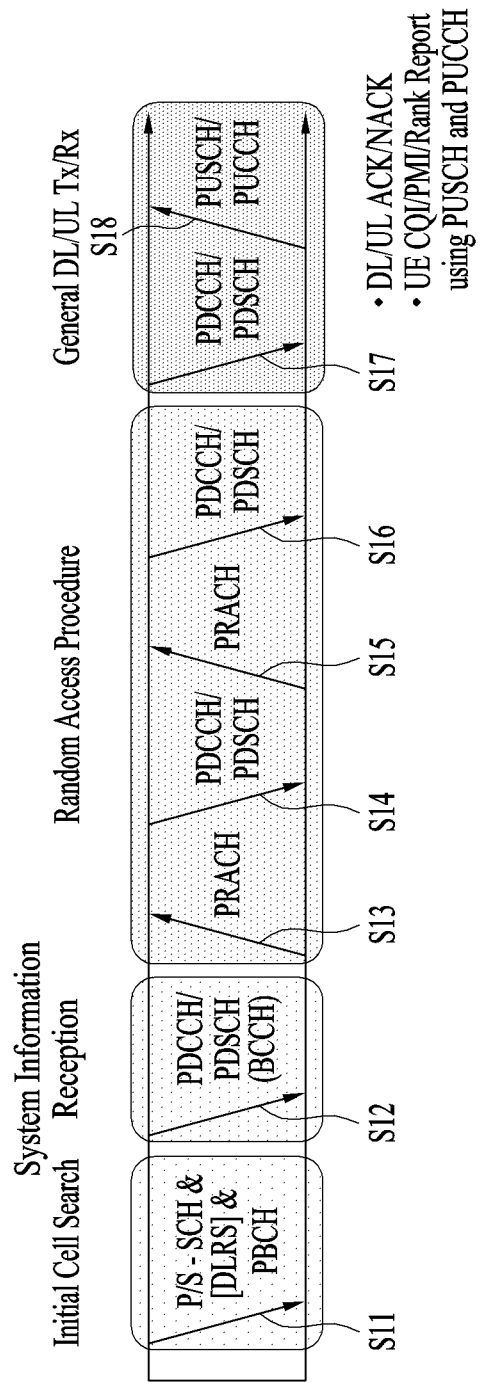
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
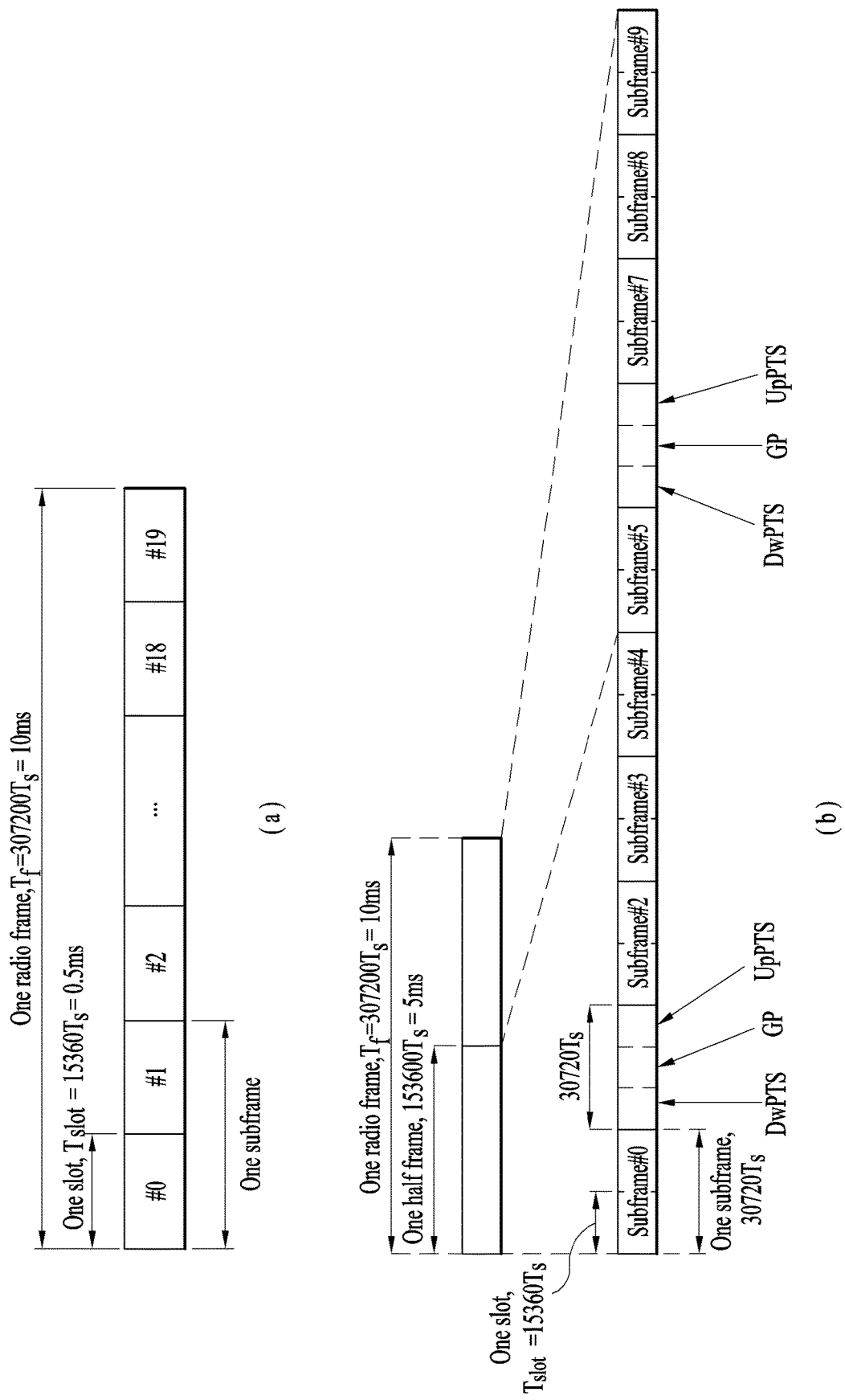
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
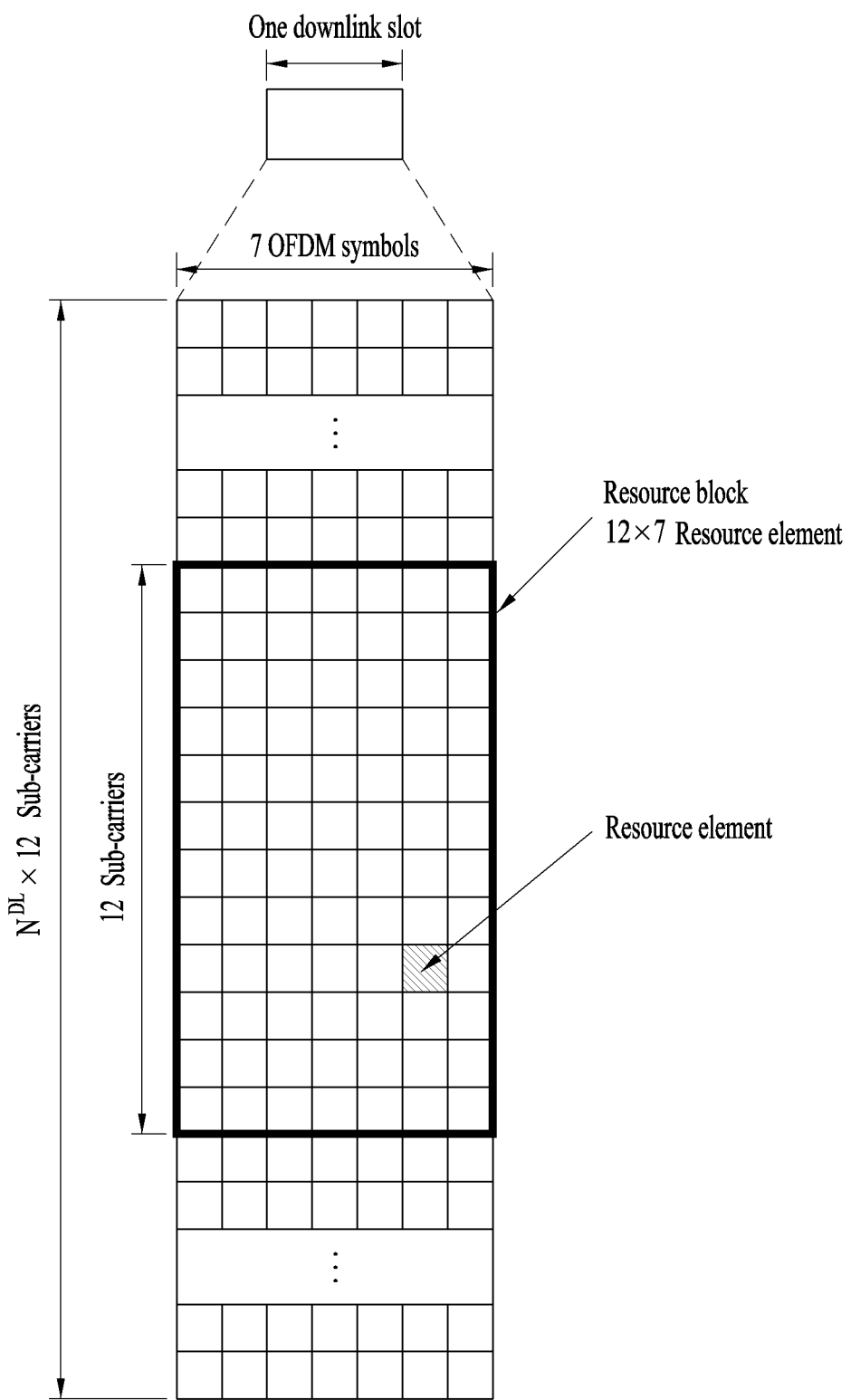
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
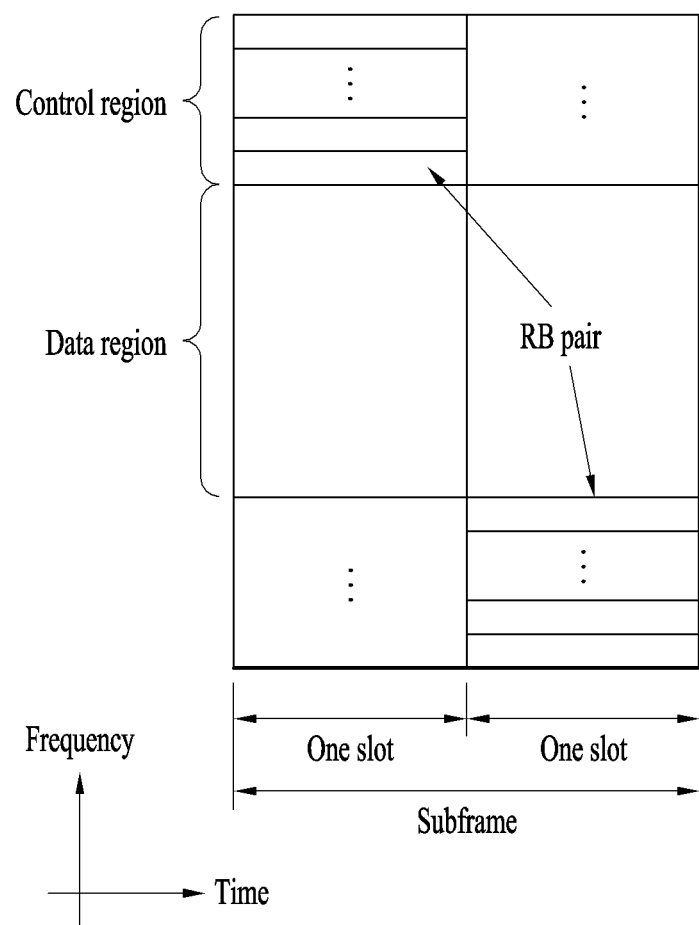
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
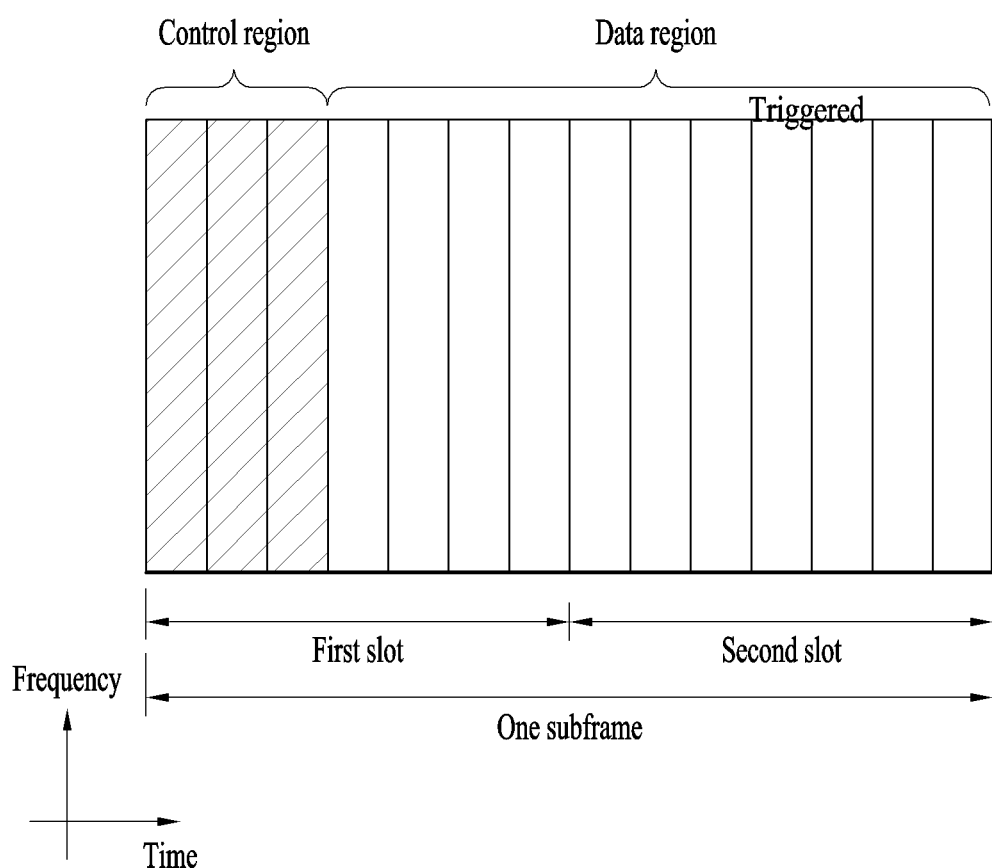
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

2.1. Numerologies

The NR system to which the present invention is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 3

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{symb}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe,\mu} - 1\}$ and may also be numbered within a frame in ascending order like $n_{s,f}^\mu \in \{0, \ldots, N_{slot}^{frame,\mu}-1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present invention can be applied, a self-contained slot structure can be applied based on the above-described slot structure.

Figure 6:
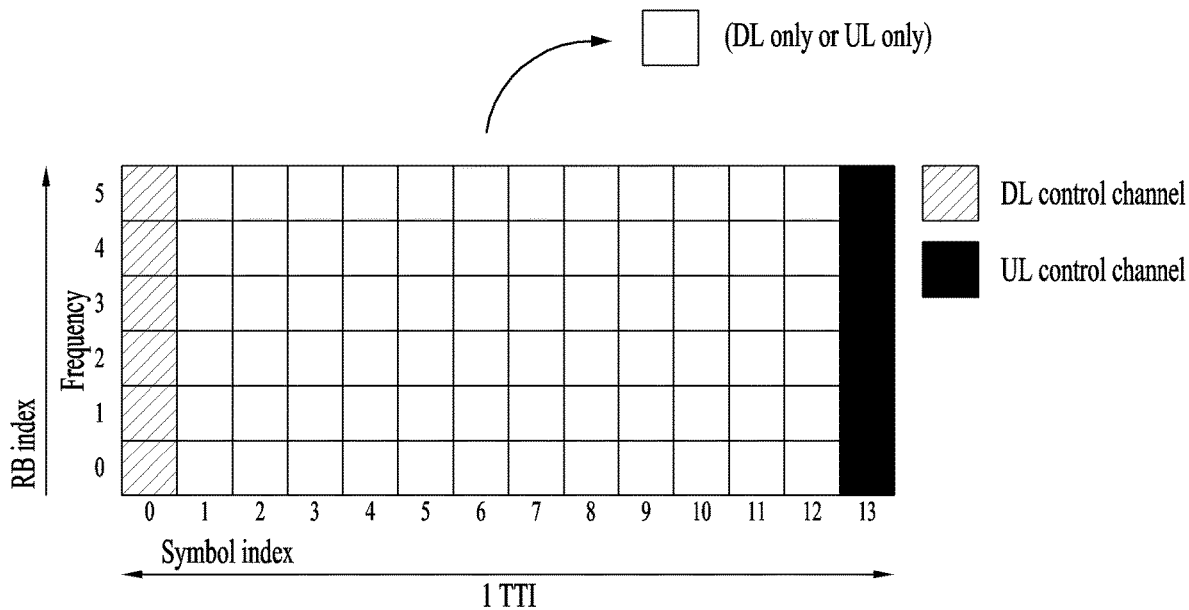
FIG. 6 is a diagram illustrating a self-contained subframe structure applicable to the present invention.

FIG. 6 is a diagram illustrating a self-contained slot structure applicable to the present invention.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot.

Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
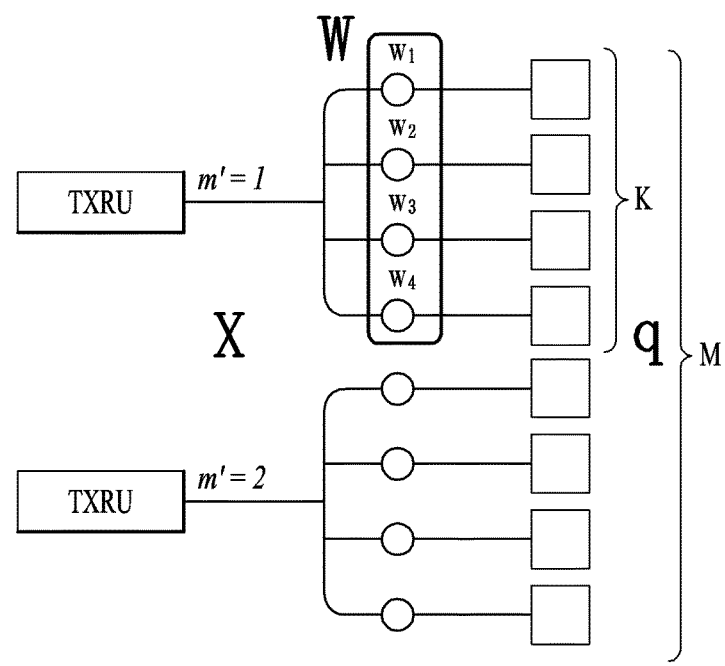
FIGS. 7 and 8 are diagrams illustrating representative connection methods for connecting TXRUs to antenna elements.
Figure 8:
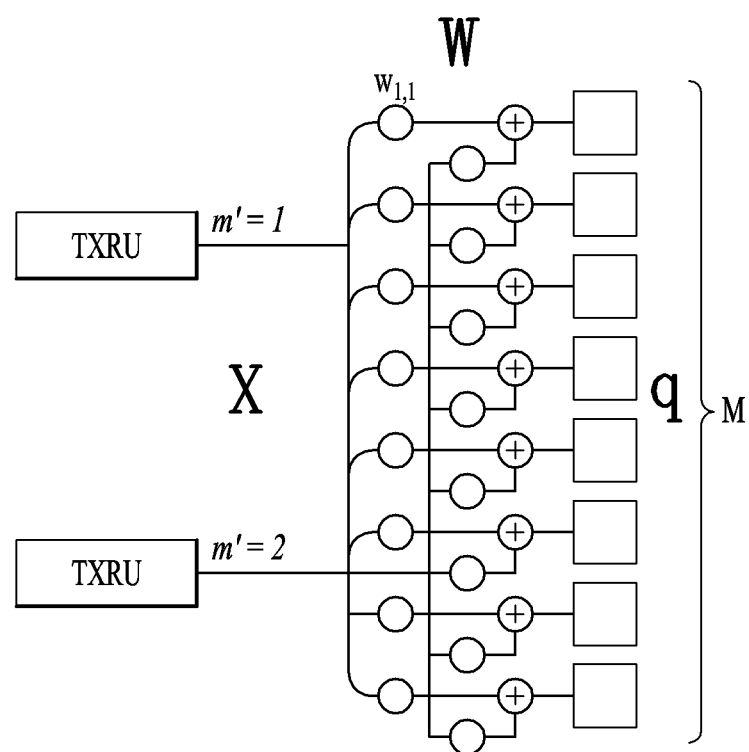

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present invention is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
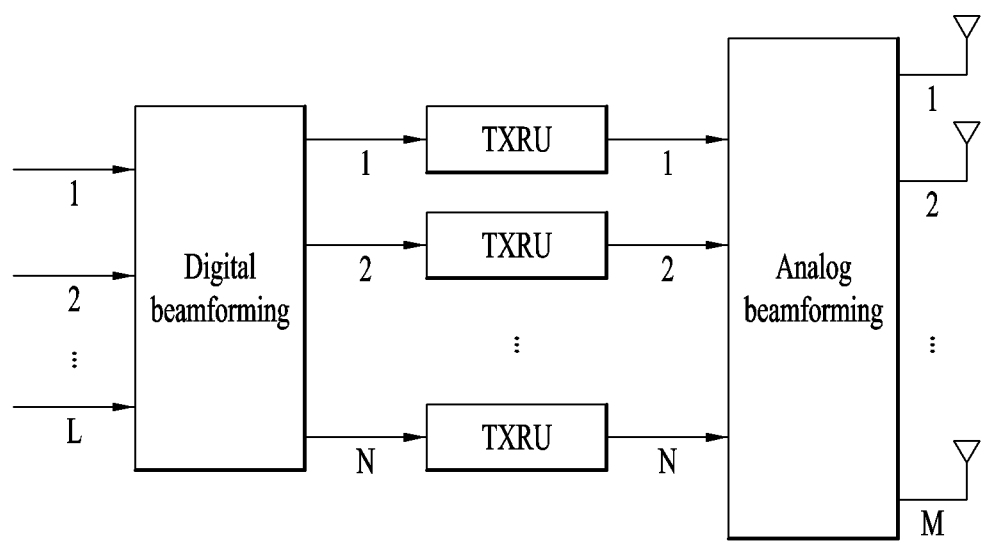
FIG. 9 is a schematic diagram illustrating a hybrid beamforming structure according to an embodiment of the present invention from the perspective of TXRUs and physical antennas.

FIG. 9 is a schematic diagram illustrating a hybrid beamforming structure according to an embodiment of the present invention from the perspective of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present invention is applicable. Further, a method of introducing a plurality of antenna panels where independent hybrid beamforming can be applied by defining N TXRUs and M RF antennas as one antenna panel has also been considered in the NR system to which the present invention is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present invention is applicable.

Figure 10:
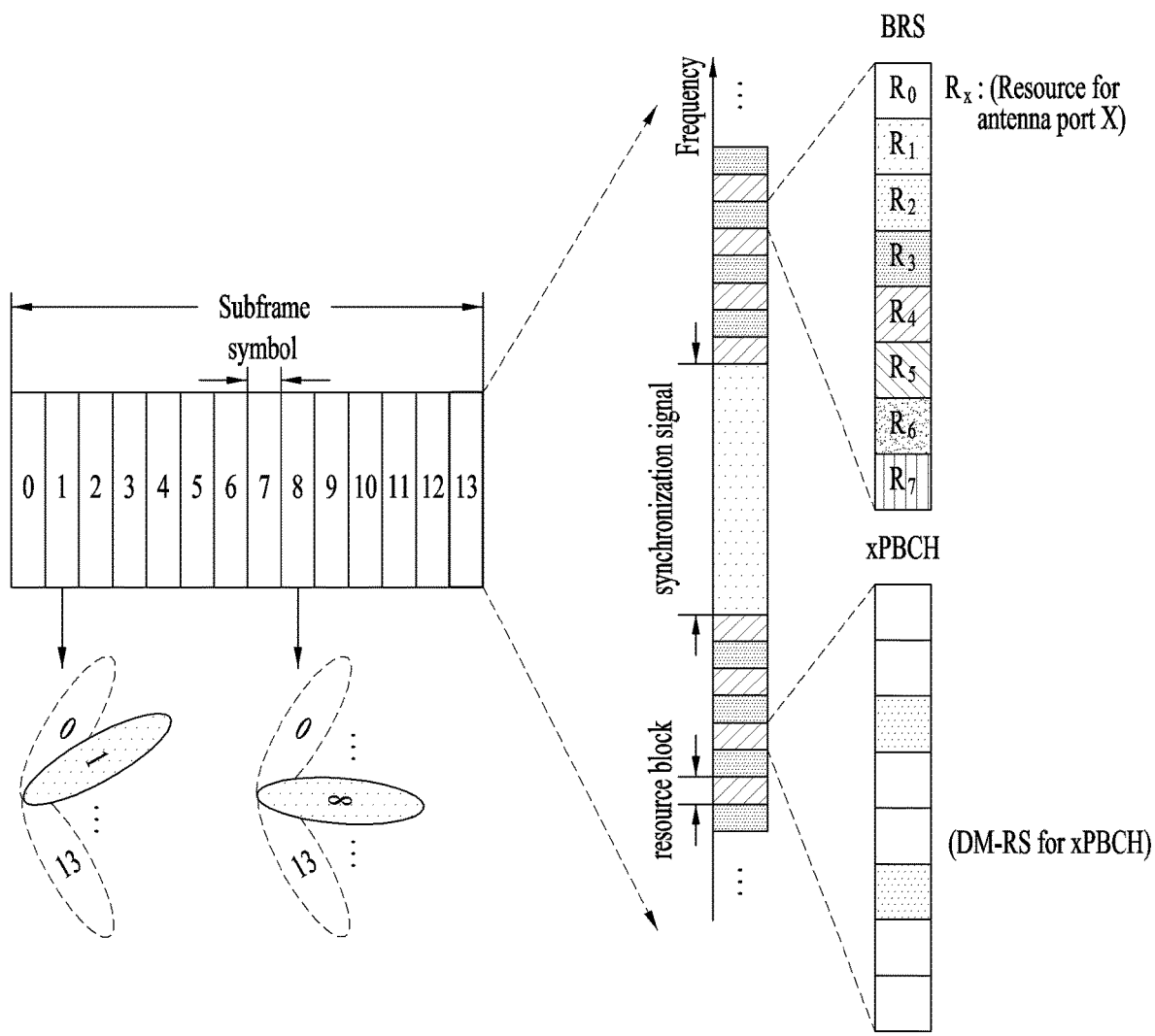
FIG. 10 is a diagram schematically illustrating the beam sweeping operation for synchronization signals and system information during a downlink (DL) transmission process according to an embodiment of the present invention.

FIG. 10 is a diagram schematically illustrating the beam sweeping operation for synchronization signals and system information during a downlink (DL) transmission process according to an embodiment of the present invention In FIG. 10, a physical resource (or channel) for transmitting system information of the NR system to which the present invention is applicable in a broadcasting manner is referred to as a physical broadcast channel (xPBCH). In this case, analog beams belonging to different antenna panels can be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present invention is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

2.4. PT-RS (Phase Tracking Reference Signal)

Hereinafter, phase noise will be described. Jitter, which occurs in the time domain, may appear as phase noise in the frequency domain. Such phase noise randomly changes the phase of the received signal in the time domain as shown in the following equation.

$$r_n = s_n e^{j\phi_n} \text{ where} \quad [\text{Equation 1}]$$

$$s_n = \sum_{k=0}^{N-1} d_k e^{j2\pi \frac{kn}{N}}$$

In Equation 1, the parameters $r_n$, $s_n$, $d_k$, $\phi_n$ indicate a received signal, a time-domain signal, a frequency-domain signal, and a phase rotation value due to phase noise, respectively. When the DFT (discrete Fourier transform) process is applied the received signal in Equation 11, Equation 2 is obtained.

$$y_k = d_k \frac{1}{N} \sum_{n=0}^{N-1} e^{j\phi_n} + \frac{1}{N} \sum_{\substack{t=0 \\ t \neq k}}^{N-1} d_t \sum_{n=0}^{N-1} e^{j\phi_n} e^{j2\pi(t-k)n/N} \quad [\text{Equation 2}]$$

In Equation 2, the parameters $$\frac{1}{N} \sum_{n=0}^{N-1} e^{j\phi_n}, \frac{1}{N} \sum_{\substack{t=0 \\ t \neq k}}^{N-1} d_t \sum_{n=0}^{N-1} e^{j\phi_n} e^{j2\pi(t-k)n/N}$$

indicate common phase error (CPE) and inter-cell interference (ICI), respectively. In this case, as phase noise correlation increases, the value of the CPE in Equation 12 increases. Such CPE can be considered as a kind of carrier frequency offset in a WLAN system, but from the perspective of the UE, the CPE and CFO could be interpreted as to be similar to each other.

By performing CPE/CFO estimation, the UE can eliminate CPE/CFO corresponding to phase noise in the frequency domain. In addition, to correctly decode a received signal, the UE should perform the CPE/CFO estimation before decoding the received signal. Accordingly, the eNB can transmit a certain signal to the UE in order for the UE to perform the CPE/CFO estimation accurately. That is, the main purpose of such a signal is to estimate phase noise. To this end, a pilot signal previously shared between the eNB and UE in advance may be used, or a data signal may be changed or duplicated. In this specification, a series of signals for estimating phase noise are commonly called the phase compensation reference signal (PCRS), phase noise reference signal (PNRS), or phase tracking reference signal (PT-RS). Hereinafter, for convenience of description, all of them are referred to as the PT-RS.

3. Proposed Embodiment

Hereinafter, the embodiments of the present invention will be described in detail based on the above-described technical features.

In the following, it is assumed that the eNB (or TRP (transmission reception point) is a transmitter transmitting the PT-RS and the UE is a receiver. However, this is merely for convenience of description, and in some embodiments, the UE may be a transmitter and the eNB (or TRP) may be a receiver.

3.1. First Proposal (PTRS Design for CSI-RS Distribution and Spatial Diversity)

PT-RS precoding can be defined in the form of cyclic in the frequency domain. The eNB can inform the UE of a relationship between DM-RS and PT-RS ports explicitly/ implicitly. In addition, the eNB can inform the UE of the frequency location of each PT-RS port explicitly/implicitly.

In this case, the explicit indication may mean that the eNB explicitly informs the UE of "the relationship between the DM-RS and PT-RS ports" and "the frequency locations of the PT-RS ports" through RRC and/or MAC-CE and/or DCI. For example, the eNB may configure a frequency region capable of transmitting the PT-RS within a specific frequency block through RRC signaling.

In addition, the implicit indication may mean that the UE implicitly recognizes/obtains "the relationship between the DM-RS and PT-RS ports" and "the frequency locations of the PT-RS ports" through BW and/or rank and/or MCS (modulation and coding scheme). For example, the UE may determine the frequency location of the PT-RS using that of the DM-RS port, which is associated with the PT-RS, among allocated DM-RS ports.

Figure 11:
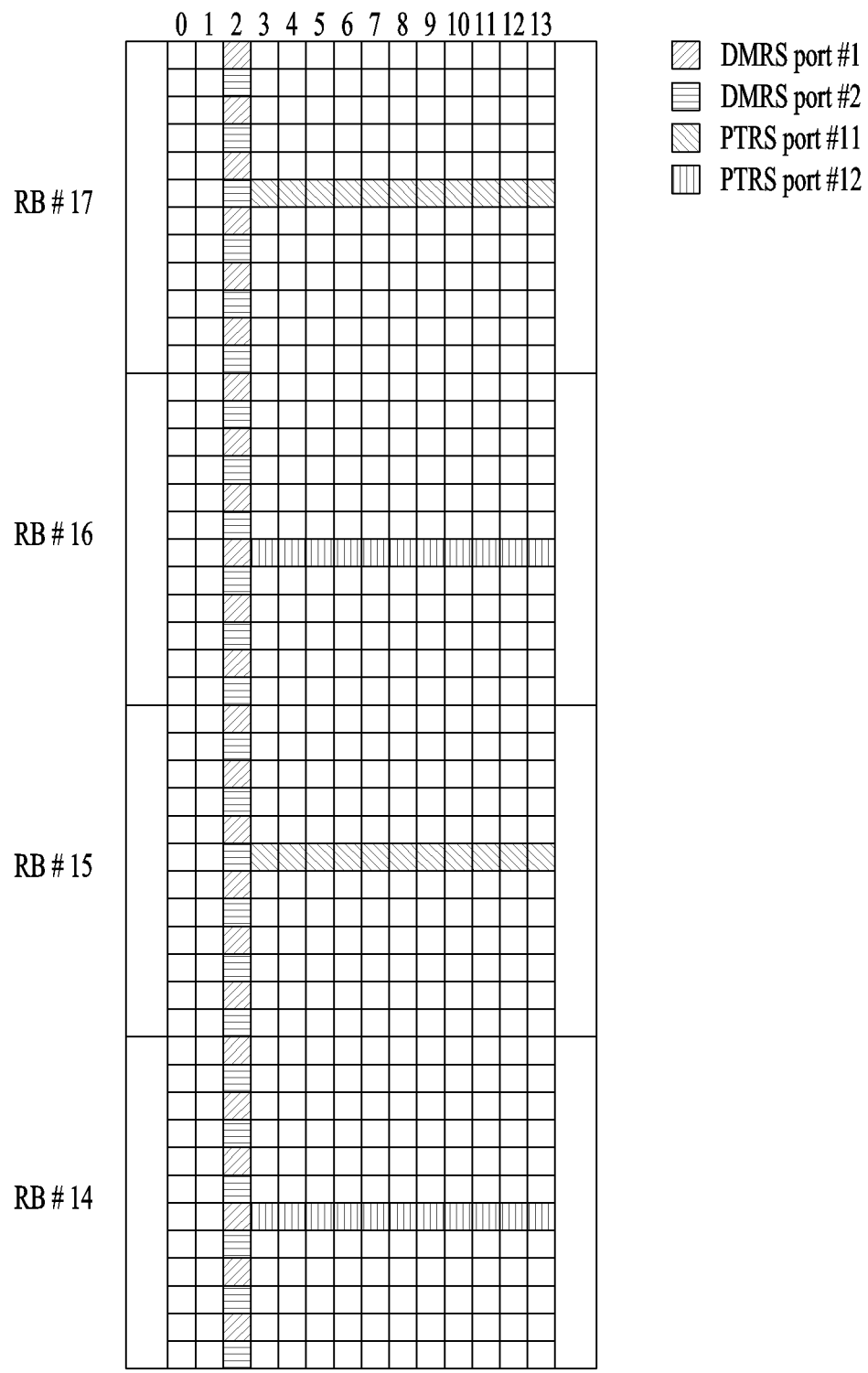
FIG. 11 is a diagram schematically illustrating DM-RS and PT-RS transmission operation of a UE according to an embodiment of the present invention.

FIG. 11 is a diagram schematically illustrating DM-RS and PT-RS mapping patterns according to an embodiment of the present invention.

As shown in FIG. 11, the transmitter may transmit the DM-RS and PT-RS to the receiver using two DM-RS ports and two PT-RS ports. In this case, each PT-RS port may be mapped to a different DM-RS port. For example, PT-RS ports #11 and #12 may be mapped to DM-RS ports #1 and #2, respectively.

In this case, the eNB may explicitly inform the UE of the above relationship, or the UE may implicitly determine the relationship.

At this time, the number of PT-RS ports may be configured through RRC signaling or MAC-CE.

Alternatively, the number of PT-RS ports may be determined by the number of given DM-RS ports. For example, assuming that the number of DM-RS ports is 4, the number of PT-RS ports may be determined as 4. Alternatively, the number of DM-RS ports may determine only the maximum number of PT-RS ports, and the number of actually used PT-RS ports may be determined through RRC signaling or MAC-CE.

If there is a single phase source, only one PT-RS port can be defined. However, if the transmitter selects a PT-RS port with better performance from two PT-RS ports and then transmits the PT-RS to the receiver, the receiver may perform the CPE estimation more accurately, but there may be an ambiguity that the receiver does not know which one of the two PT-RS ports is selected.

To eliminate the ambiguity, the transmitter may transmit the PT-RS by alternating the two PT-RS ports in the frequency domain. By doing so, it is possible to obtain additional spatial diversity. In this case, information indicating the (resource) locations at which PTRS ports #1 and #2 are defined may be provided by the eNB to the UE explicitly or implicitly.

For example, the UE may map PTRS port #11 to the RE with the smallest frequency-domain index in allocated RBs and then map PTRS port #12 to the next RE. That is, the UE may transmit or receive the PT-RS by mapping different PTRSP ports in the frequency domain as described above.

Figure 12:
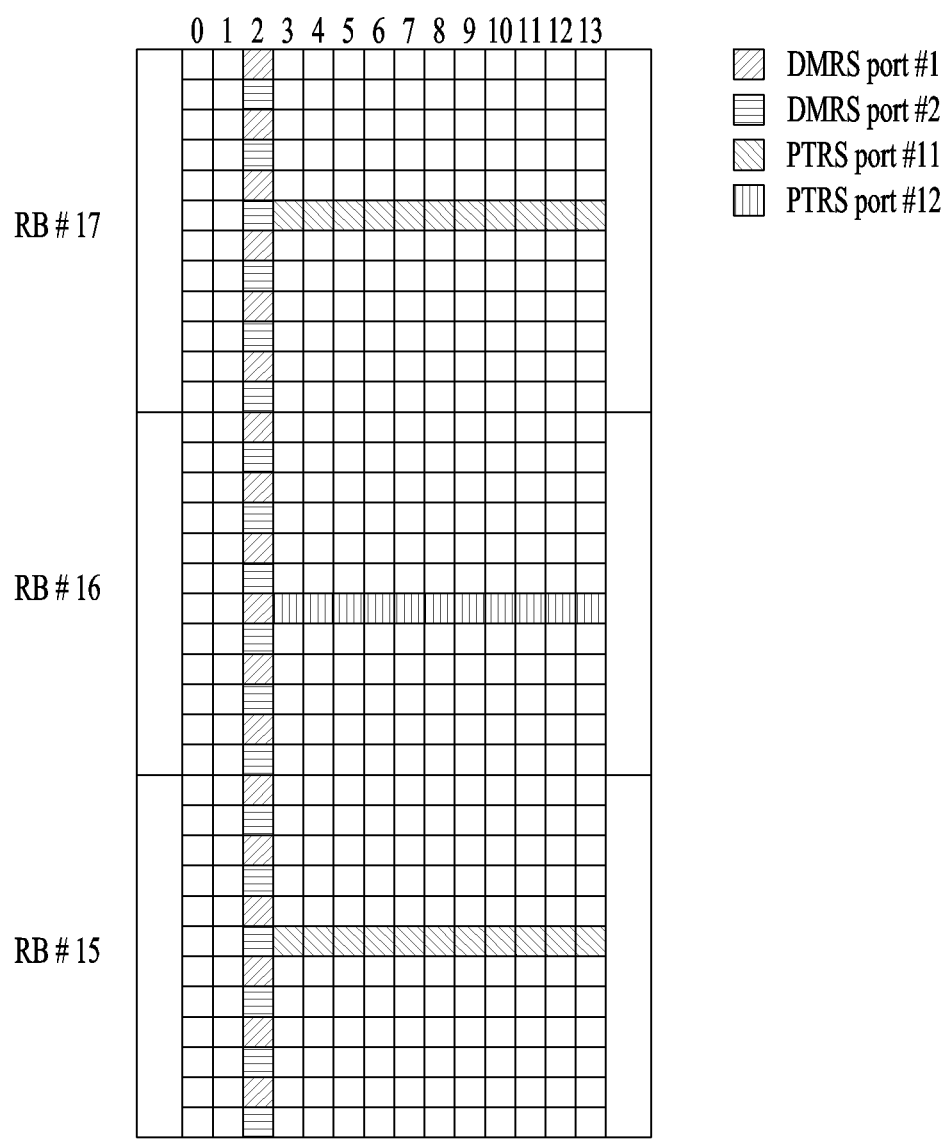
FIG. 12 is a diagram schematically illustrating DM-RS and PT-RS mapping patterns according to another embodiment of the present invention.

FIG. 12 is a diagram schematically illustrating DM-RS and PT-RS mapping patterns according to another embodiment of the present invention. In this case, it is assumed that 3 RBs are allocated to the UE.

In this case, as shown in FIG. 12, PTRS port #11 may be mapped to two RBs, and PTRS port #12 may be mapped to one RB.

Figure 13:
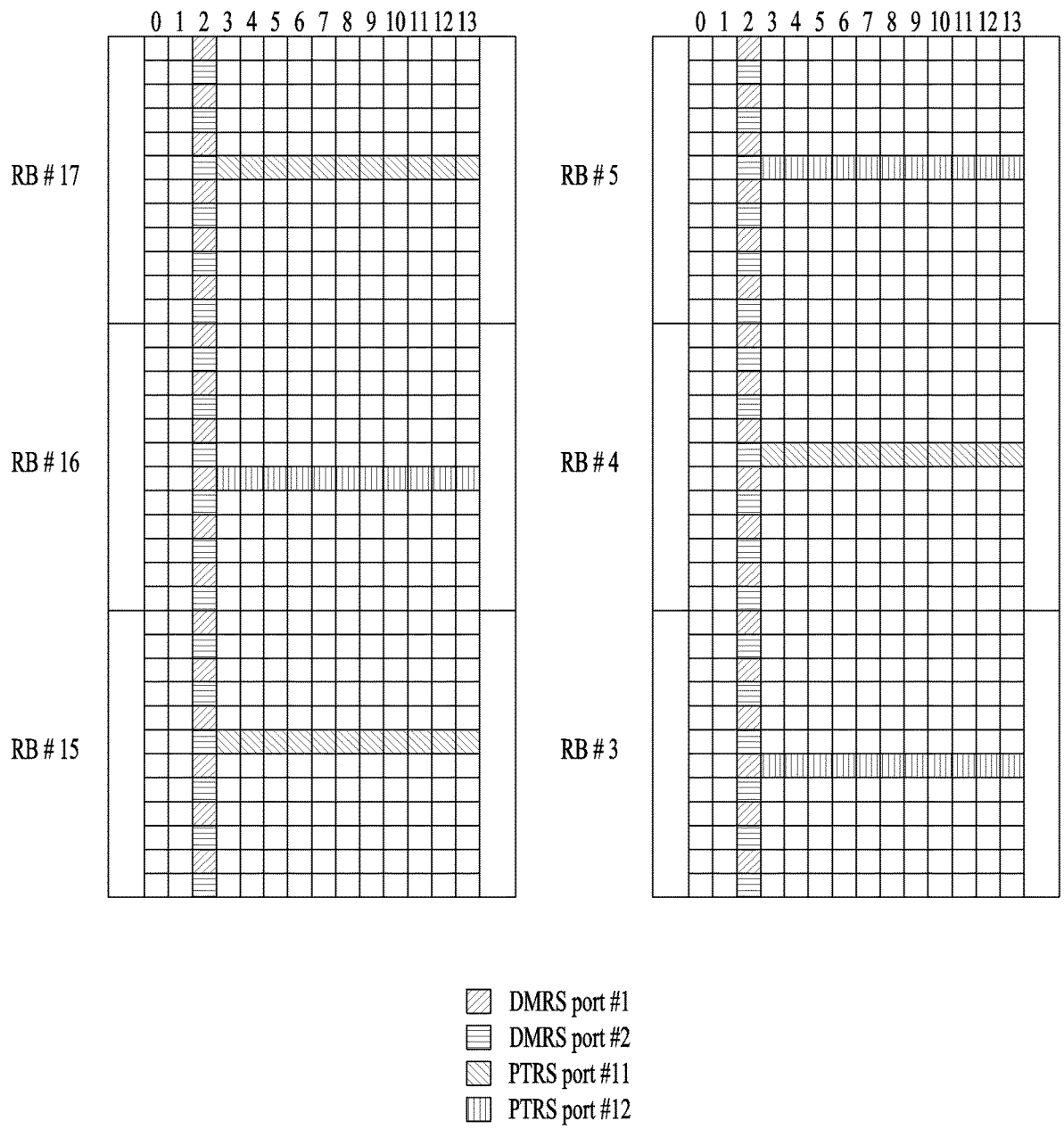
FIG. 13 is a diagram schematically illustrating DM-RS and PT-RS mapping patterns according to a further embodiment of the present invention.

FIG. 13 is a diagram schematically illustrating DM-RS and PT-RS mapping patterns according to a further embodiment of the present invention. In this case, it is assumed that divided RB groups are allocated to the UE.

In this case, the UE may map PT-RS ports using virtual RB indices rather than physical RB indices. For example, after changing RBs #3 to #5 and RBs #15 to #17 to vRBs #1 to #6, the UE may map different PT-RS ports to the frequency domain in an alternate manner. Thereafter, the UE may transmit or receive the PT-RS through the mapped PT-RS ports.

In the present invention, the CQI can be reported per codeword. In this case, 1 codeword may be mapped to a plurality of layers (e.g., DMRS ports). At this time, the UE may know that a specific codeword has better performance than other codewords. Thus, the UE may map DM-RS and PT-RS ports such that the PT-RS ports match with a plurality of layers included in the codeword with the best CQI.

For example, in 8-layer transmission, a $1^{st}$ CW and a $2^{nd}$ CW are defined, and it is assumed that the $1^{st}$ CW is mapped to DM-RS ports #1 to #4 and the $2^{nd}$ CW is mapped to DM-RS ports #5 to #8.

In this case, if the CQI of the $1^{st}$ CW is better than that of the $2^{nd}$ CW, DM-RS ports #1 to #4 may correspond to PT-RS ports #11 to #14. At this time, PT-RS ports #11 to #14 may be alternately mapped to the frequency domain. (Alternatively, if the CQI of the $2^{nd}$ CW is better than that of the $1^{st}$ CW, DM-RS ports #5 to #8 may correspond to PT-RS ports #11 to #14).

Meanwhile, when the two CWs have the same CQI, the UE may preferentially use a specific CW (e.g., $1^{st}$ CW) at all times. That is, the DM-RS ports to which the specific CW is mapped may be mapped to PT-RS ports.

Alternatively, the UE may select a CW with more layers, and then map the DM-RS ports to which the selected CW is mapped to PT-RS ports. In this case, it is expected that the spatial diversity will be relatively increased.

Meanwhile, some of PT-RS ports #11 to #14 may be selected, and then the selected PT-RS ports may be alternately mapped to the frequency domain. For example, if the number of available PT-RS ports is set to 2 through RRC signaling, the transmitter may transmit the PT-RS by alternating PT-RS ports #11 and #12 in the frequency domain.

The eNB may configure the potential (resource) location of the PT-RS in the time and/or frequency domain in advance and then inform the UE of the potential (resource) location of the PT-RS through RRC signaling and/or MAC-CE and/or DCI.

Figure 14:
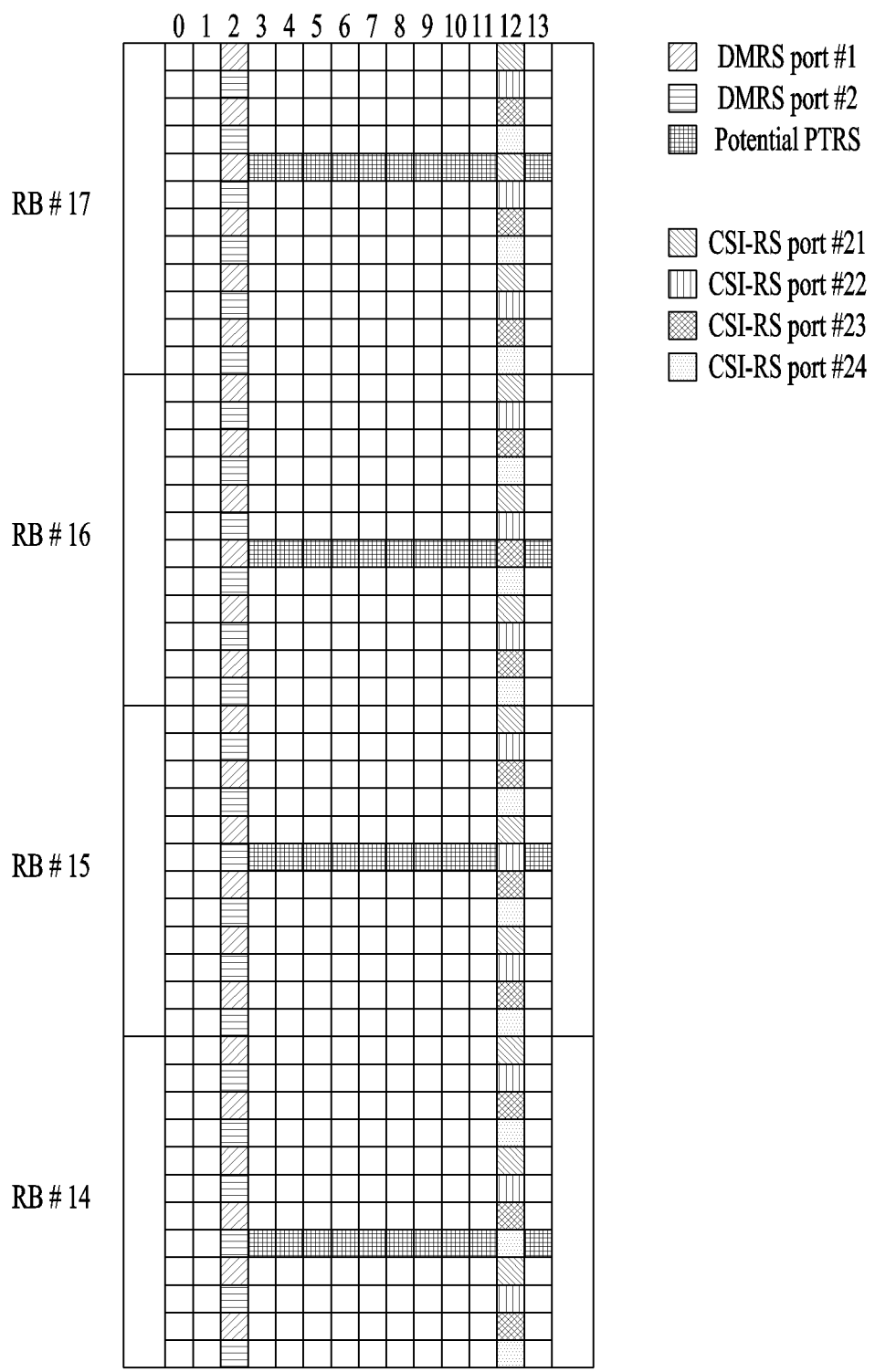
FIG. 14 illustrates an example where the frequency locations of PT-RSs are predetermined according to an embodiment of the present invention.

FIG. 14 illustrates an example where the frequency locations of PT-RSs are predetermined according to an embodiment of the present invention. In FIG. 14, the (potential) PT-RS frequency locations may be determined by considering CSI-RSs.

Accordingly, the UE may map (or define) data or PT-RSs at the potential PT-RS locations. However, in this case, PT-RSs may not be defined at other locations except the potential PT-RS (resource) locations.

As described above, the eNB can determine the potential PT-RS locations in advance so as to distribute PT-RS collision over all CSI-RS ports and then inform the UE of the potential PT-RS locations through RRC signaling and/or MAC-CE and/or DCI.

3.2. Second proposal (Frequency pattern design for PT-RS)

In the present invention, the PT-RS frequency density may be set as 1 subcarrier every 1/2/4/8/16 RB(s). That is, the PT-RS frequency density can be defined as shown in the following table.

TABLE 6

| Scheduled BW | Frequency density |
|---|---|
| $0 < N_{RB} <= 4$ | No PT-RS |
| $5 < N_{RB} <= 8$ | 1 |
| $9 < N_{RB} <= 16$ | 1/2 |
| $17 < N_{RB} <= 32$ | 1/4 |

However, it can be seen from Table 6 that the number of PT-RS subcarriers significantly decreases at the transition boundaries of frequency density. For example, when scheduled BW is 8 and 9, the corresponding numbers of PT-RS subcarriers are 8 and 4, respectively.

Thus, the number of PT-RS subcarriers for larger BW may be less than that for smaller BW.

In particular, BLER performance is more sensitive to the number of PT-RS subcarriers as allocated BW becomes larger.

Thus, referring to Table 6, it can be seen that for a specific BW, the number of PT-RS subcarriers is unsuitable. Also, there may be an ambiguity in the PRB including the PT-RS of which the frequency density is less than 1.

To solve the issues, for the frequency density less than 1, it is proposed to determine the RB index i (where i= 0, ..., L−1) according to the following equation including the PT-RS. In this case, L is the number of PT-RS subcarriers.

$$i = \left\lfloor l\frac{P}{L} \right\rfloor + k, l = 0, 1, \ldots, L-1 \quad \text{[Equation 3]}$$

In Equation 3, the parameters P and k represent the number of allocated PRBs and PRB offset value, respectively.

According to Equation 3, the number of PT-RS subcarriers can be set to be consistent without regard to the transition boundaries. In addition, the frequency density may decrease as the scheduled BW increases.

Figure 15:
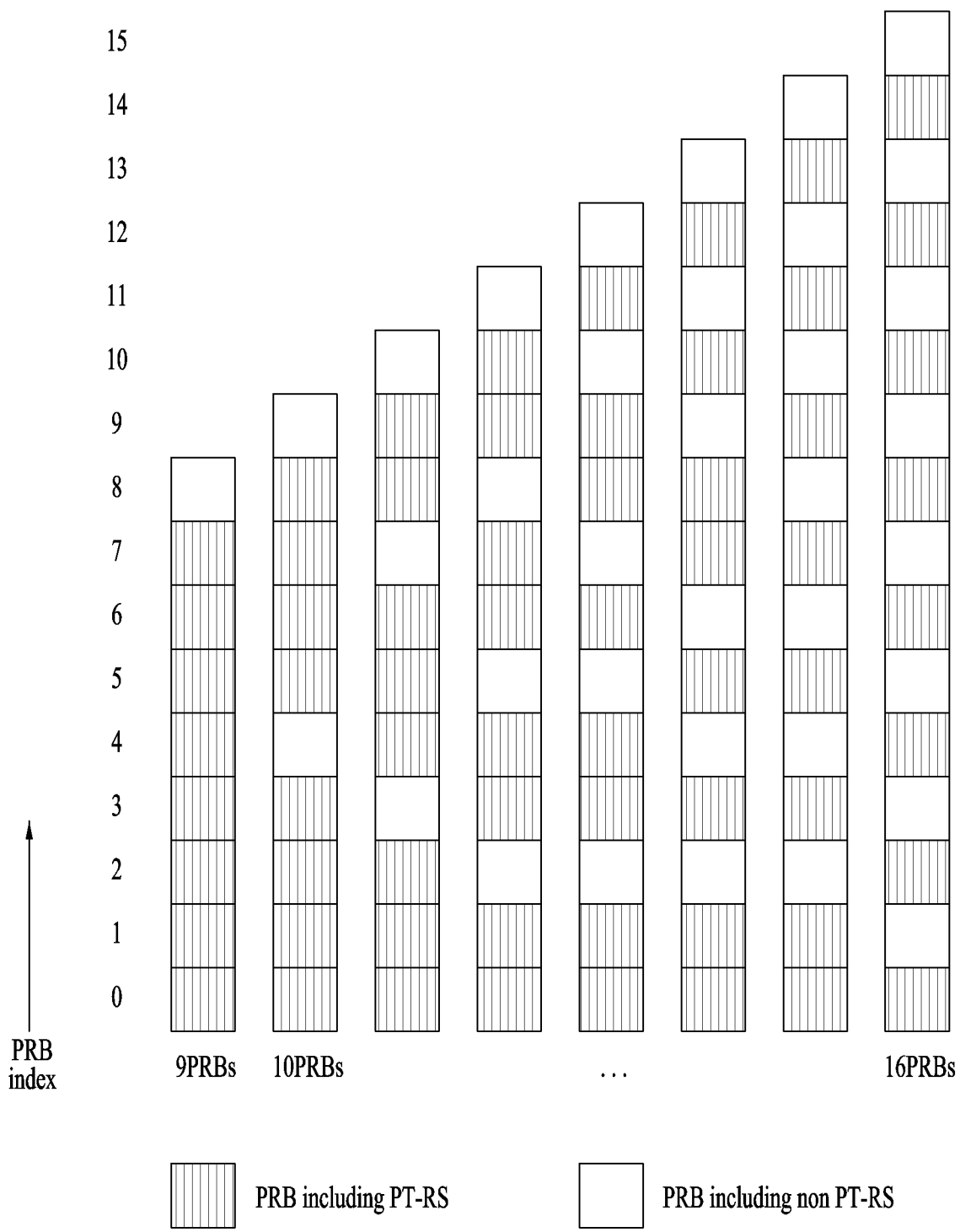
FIG. 15 is a diagram schematically illustrating a PT-RS frequency pattern applicable to the present invention.

In addition, in the case of $8<P\leq16$ and L=8 in Equation 3, the PT-RS frequency pattern may be set as shown in FIG. 15.

FIG. 15 is a diagram schematically illustrating a PT-RS frequency pattern applicable to the present invention. In FIG. 15, it is assumed that the PRB offset value, k is set to 0 for convenience of description.

In this way, Table 6 can be modified as shown in the following table. In Table 7, the value of K can be fixed according to a given range of scheduled BW (e.g., L=8 for P>8).

TABLE 7

| Scheduled BW | Frequency density |
|---|---|
| $0 < N_{RB} <= 4$ | No PT-RS |
| $5 < N_{RB} <= 8$ | 1 |
| $9 < N_{RB}$ | $L/N_{RB}$ |

Although Equation 3 assumes that rounding down is applied, rounding off or up can be applied instead of rounding down. For example, when rounding up is applied, the PRB index including the PT-RS can be calculated according to the following equation.

$$i = \left\lceil l\frac{P}{L} \right\rceil + k, l = 0, 1, \ldots, L-1 \quad \text{[Equation 4]}$$

In Equation 3 or 4, L may differ per BW. This is because as BW increases, the number of required PT-RSs (L) may increase.

In this case, the definition shown in the following table can be applied.

TABLE 8

| Scheduled BW | Frequency density |
|---|---|
| $0 < N_{RB} <= BW_1$ | No PT-RS |
| $BW_1 < N_{RB} <= BW_2$ | 1 or $L_1/N_{RB}$ |
| $BW_2 < N_{RB} <= BW_3$ | $L_2/N_{RB}$ |
| ... | ... |
| $BW_{N-1} < N_{RB} <= BW_N$ | $L_{N-1}/N_{RB}$ |

Meanwhile, when the number of PT-RSs defined in the frequency domain is over a predetermined level, the increase in the number of PT-RSs may increase overhead rather than improving performance, thereby incurring a loss in terms of spectral efficiency.

Thus, $L_x$ (x=1, ..., N−1) can be defined as follows.

$$L_1 \leq L_2 \ldots \leq L_{N-1} \quad \text{[Equation 5]}$$

The above-described equation for calculating the PRB index including the PT-RS can be applied to the virtual PRB index. That is, even if PRBs are not actually consecutive, the PT-RS frequency location can be determined by applying the virtual PRB index to the above equation.

For example, when physical PRBs are actually located as follows, the locations of virtual PRBs can be changed as follows.

The allocated physical PRB indices can be changed as follows: PRB index=PRB #10~#15, PRB #30~#39->vPRB #0~#15.

Next, the above equation can be applied based on the changed vPRBs.

Thereafter, the PT-RS frequency location on the basis of the vPRBs, which are calculated according to the above equation, can be calculated based on physical PRB indices according to the following methods.

In the case of vPRB #A in the range of vPRB #0~#5, it corresponds to PRB #A+10.

In the case of vPRB #B in the range of vPRB #6~#15, it corresponds to PRB #B+24

Additionally, the above equation can be modified as shown in the following equation by considering the locations of physical resources.

$$i = \left\lfloor l\frac{P}{L} \right\rfloor + k + p_0, l = 0, 1, \ldots, L-1 \quad \text{[Equation 6]}$$

In Equation 6, $p_0$ indicates the lowest index of the allocated physical PRB.

The equation can be used when all physical PRBs are consecutive.

3.3. Third Proposal (PT-RS Port Multiplexing for Time CDMed DMRS Ports)

Figure 16:
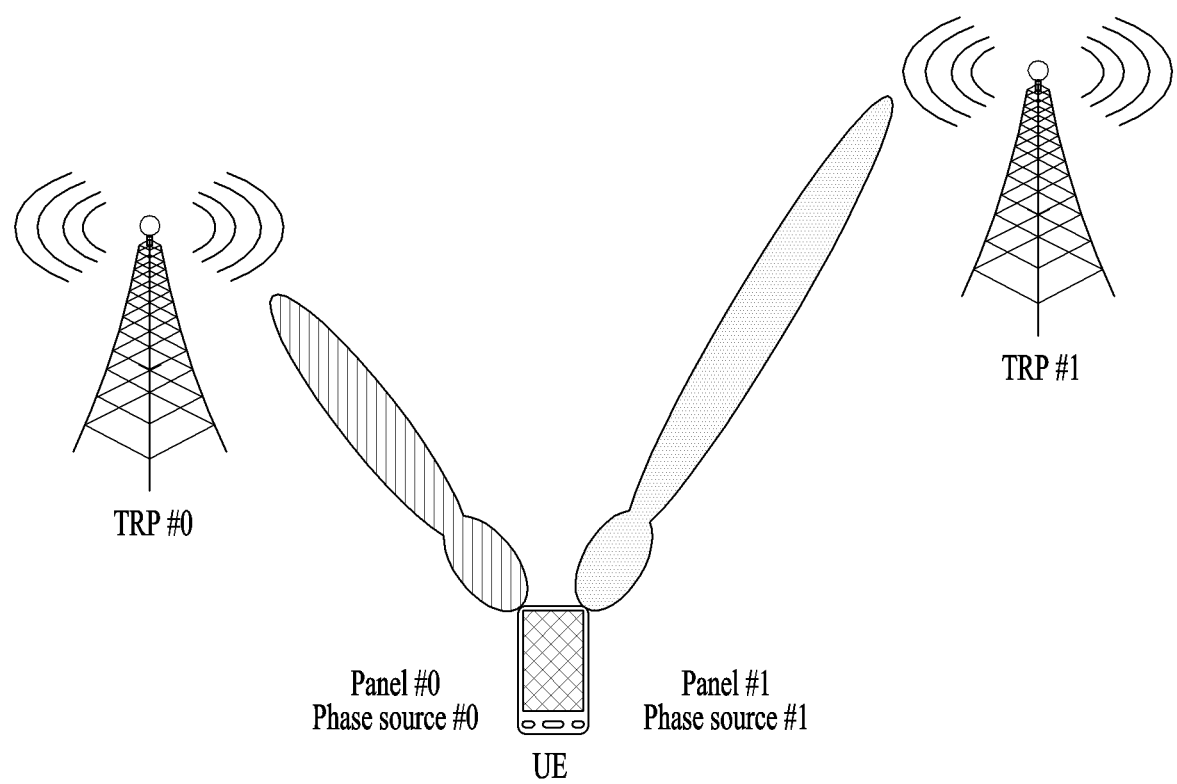
FIG. 16 is a diagram illustrating a case where two different DM-RS port groups are supported for a single UE.

FIG. 16 is a diagram illustrating a case where two different DM-RS port groups are supported for a single UE.

As shown in FIG. 16, when two different DM-RS port groups (e.g., transmission reception points (TRPs)) are supported for the single UE, one PT-RS port can be defined per DM-RS port group.

In the present invention, it is assumed that DM-RS ports #0 and #1 are allocated to DM-RS port group #0 and DM-RS ports #7 and #8 are allocated to DM-RS port group #1. And, the PT-RS can be defined in each DM-RS port group.

Figure 17:
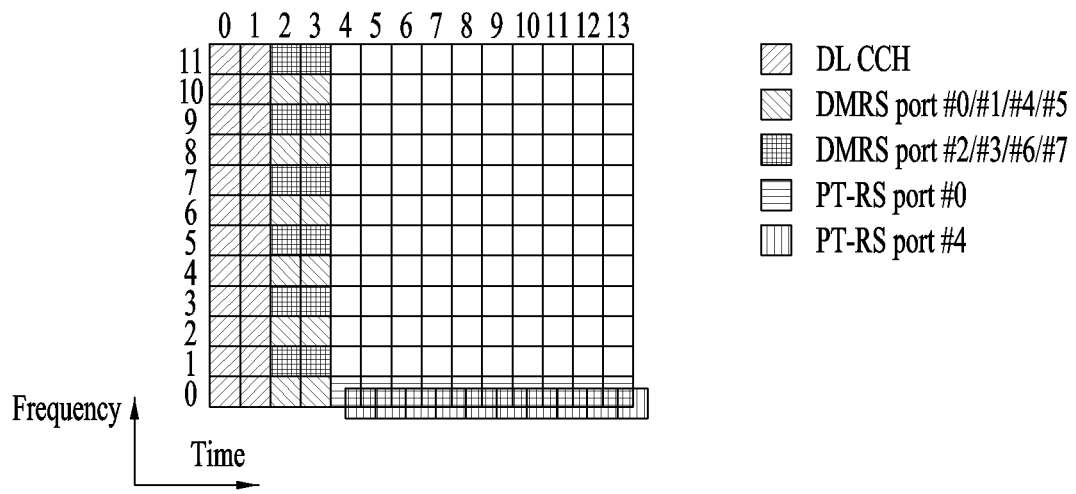
FIG. 17 is a diagram schematically illustrating a potential problem that may occur when a PT-RS is defined in each DM-RS port group.

FIG. 17 is a diagram schematically illustrating a potential problem that may occur when a PT-RS is defined in each DM-RS port group.

As shown in FIG. 17, when PT-RSs defined for the individual DM-RS port groups overlap with each other on the same resources, there may occur a problem that the PT-RSs cannot be distinguished from each other.

Hereinafter, an example where when a PT-RS port is associated with each of a plurality of DM-RS ports in the CDM-T relationship, each PT-RS port is mapped to REs (subcarriers) in the CDM-F relationship will be described in detail.

In this case, association between a specific DM-RS port and a specific PT-RS port may mean that the same precoding is applied to the two ports. Alternatively, association between one or more DM-RS ports (e.g., DM-RS port group) and a specific PT-RS port may mean that the one or more DM-RS ports (e.g., DM-RS port group) share common phase error based on a PT-RS transmitted at the PT-RS port.

Figure 18:
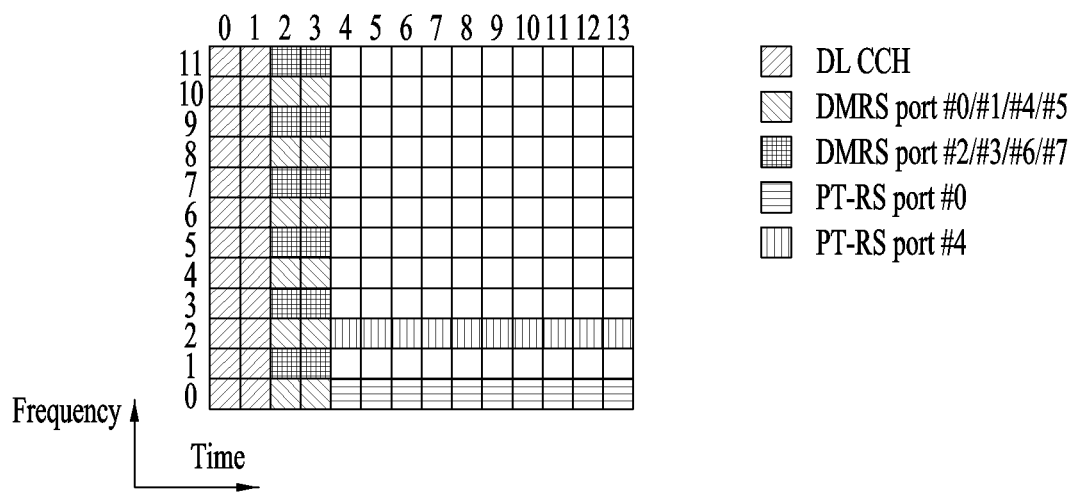
FIG. 18 is a diagram schematically illustrating an example of PT-RS port mapping according to an embodiment of the present invention.

FIG. 18 is a diagram schematically illustrating an example of PT-RS port mapping according to an embodiment of the present invention.

As shown in FIG. 18, PT-RS port #4 can be mapped to RE2 (or subcarrier), which is code division multiplexed (CDMed) with RE0 (or subcarrier), in the frequency domain. By doing so, orthogonality between PT-RS ports #0 and #4 can be maintained.

To implement a method for mapping two PT-RS ports in the CDM-T relationship to different REs (or subcarriers), the following rule can be considered.

(1) DM-RS Configuration 1
  When a PT-RS port is associated with one of DM-RS ports #0 to #3, the PT-RS port is located at the lower RE of two REs (or subcarriers) in the CDM-F relationship.
  When a PT-RS port is associated with one of DM-RS ports #4 to #7, the PT-RS port is located at the upper RE of two REs (or subcarriers) in the CDM-F relationship.

(2) DM-RS Configuration 2
  When a PT-RS port is associated with one of DM-RS ports #0 to #5, the PT-RS port is located at the lower RE of two REs (or subcarriers) in the CDM-F relationship.
  When a PT-RS port is associated with one of DM-RS ports #6 to #11, the PT-RS port is located at the upper RE of two REs (or subcarriers) in the CDM-F relationship.

Meanwhile, it is assumed in FIG. 18 that DM-RS ports #0 to #3 are in the CDM-F or FDM relationship and they are CDM-Ted with DM-RS ports #4 to #7. However, FIG. 18 shows one example of port numbering, and it may be applied in a different way from FIG. 18. The important point is that the location of the subcarrier to which the PT-RS port is mapped can be determined according to whether the CDM-F, FDM, or CDM-T is applied to the DM-RS ports. This can be equally applied to above DM-RS configurations 1 and 2.

The rule can be applied only when a PT-RS port is associated with each of a plurality of DM-RS ports in the CDM-T relationship. In this case, if it does not belong to the aforementioned cases, the PT-RS port may be located at the lower RE of two REs (or subcarriers) in the CDM-F relationship.

As a particular embodiment, regarding DM-RS configuration 1, when a PT-RS port is defined only for DM-RS port #4 except DM-RS port #0, the PT-RS port corresponding to DM-RS port #4 can be mapped as follows.

In the above-described rule, the lower/upper locations according to each condition can be switched to each other.

In addition, the lower/upper locations according to each condition can be configured through RRC signaling.

Moreover, the basic PT-RS location can be defined to be located over the RE (subcarrier) where CDM-F is applied. In this case, the above-described embodiment can be modified as follows.

As a particular embodiment, regarding DM-RS configuration 1, when a PT-RS port is defined only for DM-RS port #4 except DM-RS port #0, the PT-RS port corresponding to DM-RS port #4 can be mapped somewhat above.

According the above-described rule, it is possible to maintain orthogonality between PT-RS ports.

In addition, in the case of single DCI, different DM-RS port groups have the same BW, and in particular, in the case of 1 CW (codeword), they have the same MCS. In this case, if the MCS satisfies PT-RS transmission conditions, all DM-RS port group should transmit PT-RSs. In this case, the case shown in FIG. 18 may be caused.

Thus, the rule proposed in the present invention may be a solution suitable for single DCI.

Meanwhile, in the case of multi-DCI, different DM-RS port groups have different BW and MCSs. However, when the above-described proposal is applied, orthogonality between PT-RS ports can also be maintained.

In addition, when a PT-RS port is associated with each of a plurality of DM-RS ports in the CDM-T relationship, individual PT-RS ports are located in the same RB or different RBs.

Hereinafter, although the invention is described based on an example where different PT-RS ports are located in different RBs, in some embodiments, the different PT-RS ports may be located in the same RB.

Figure 19:
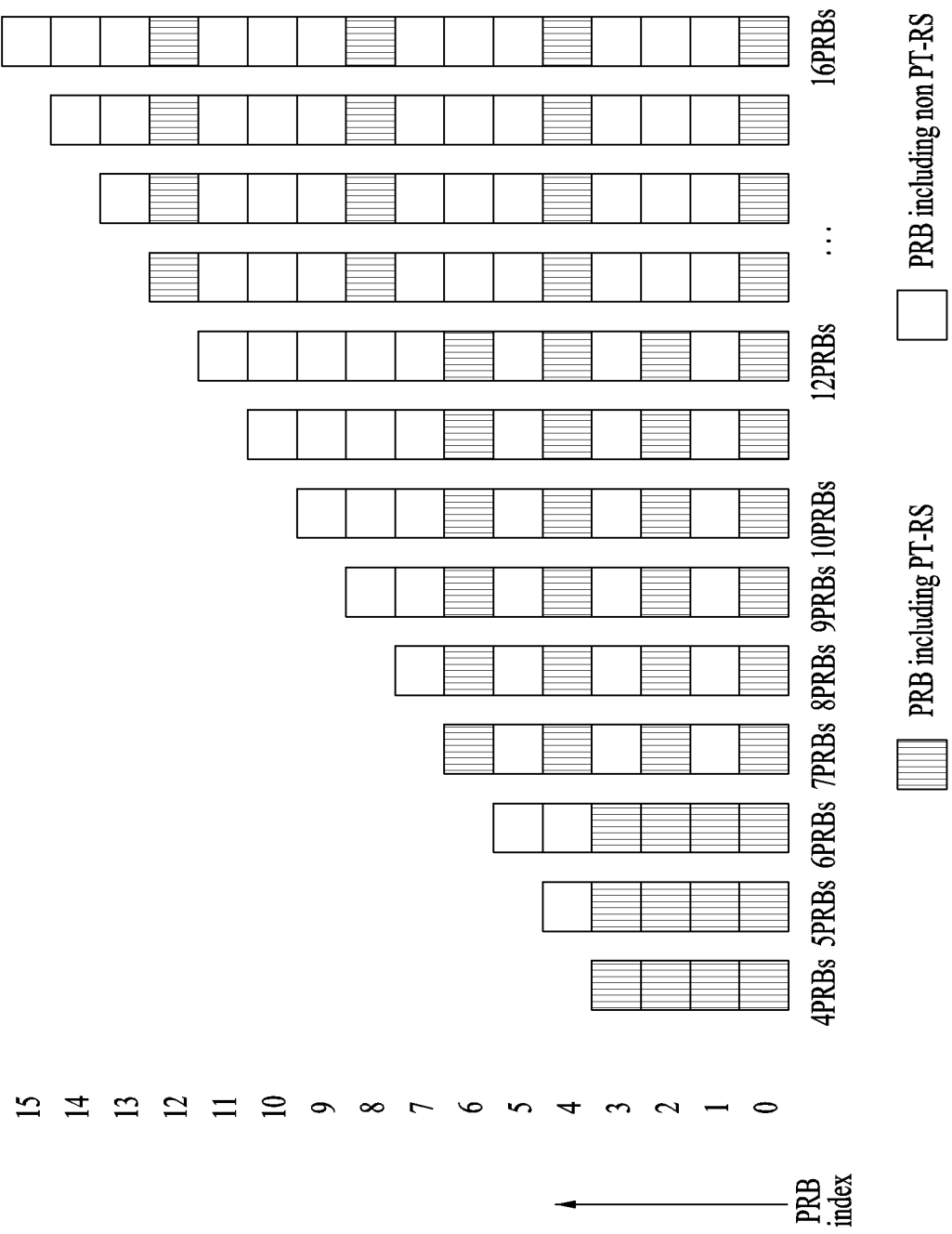
FIGS. 19 and 20 are diagrams schematically illustrating examples of PT-RS mapping according to another embodiment of the present invention.
Figure 20:
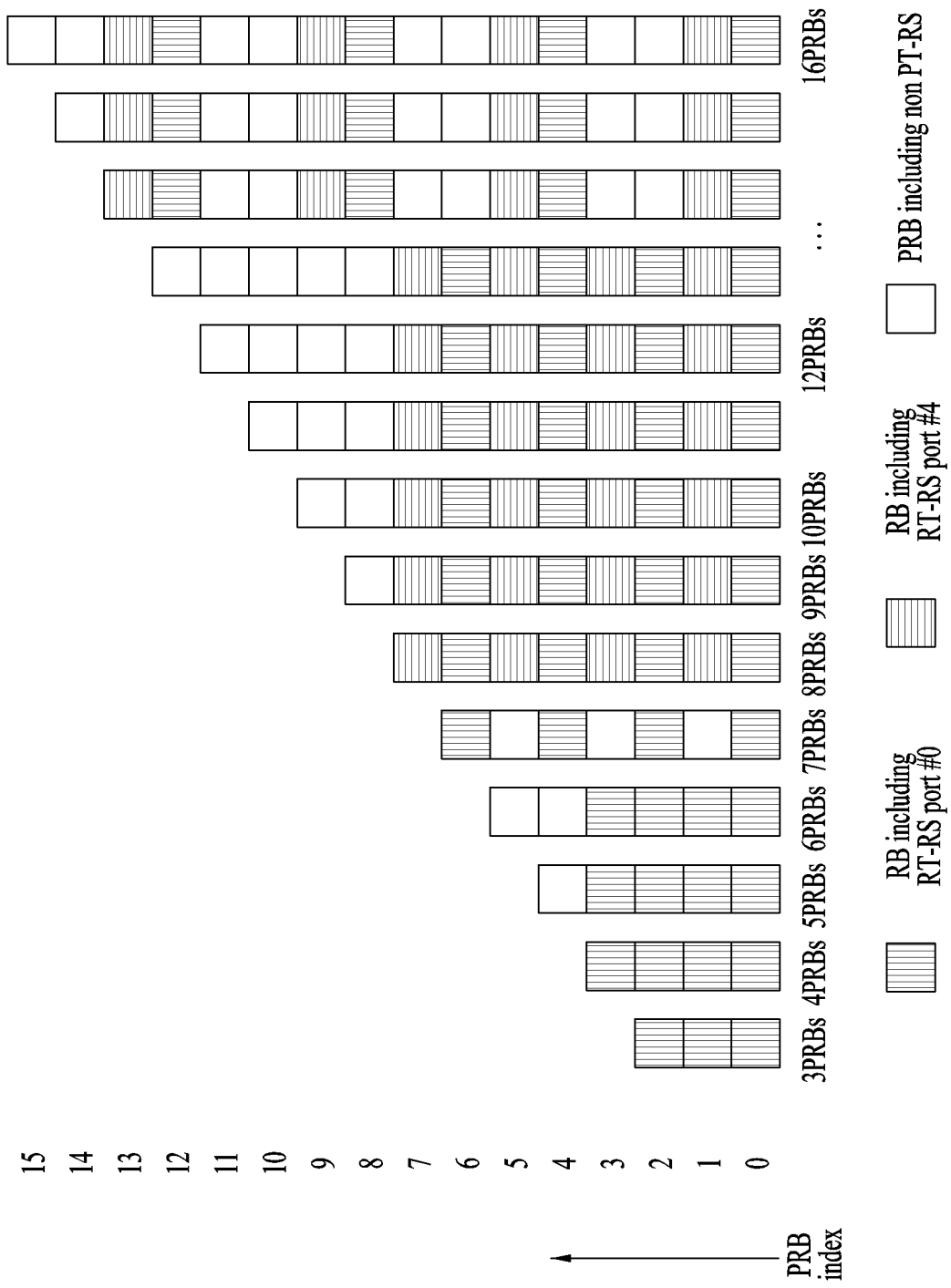

FIGS. 19 and 20 are diagrams schematically illustrating examples of PT-RS mapping according to another embodiment of the present invention.

In FIG. 19, for the BW after 8-RB, adjacent PT-RSs may be mapped at an interval of one RB or more in the frequency domain.

According to the above-described features, different PT-RS ports can be distributed in an RB-wise manner as shown in FIG. 20.

3.4. Fourth Proposal Higher Layer Signalling for PT-RS Potential Location Indication)

Figure 21:
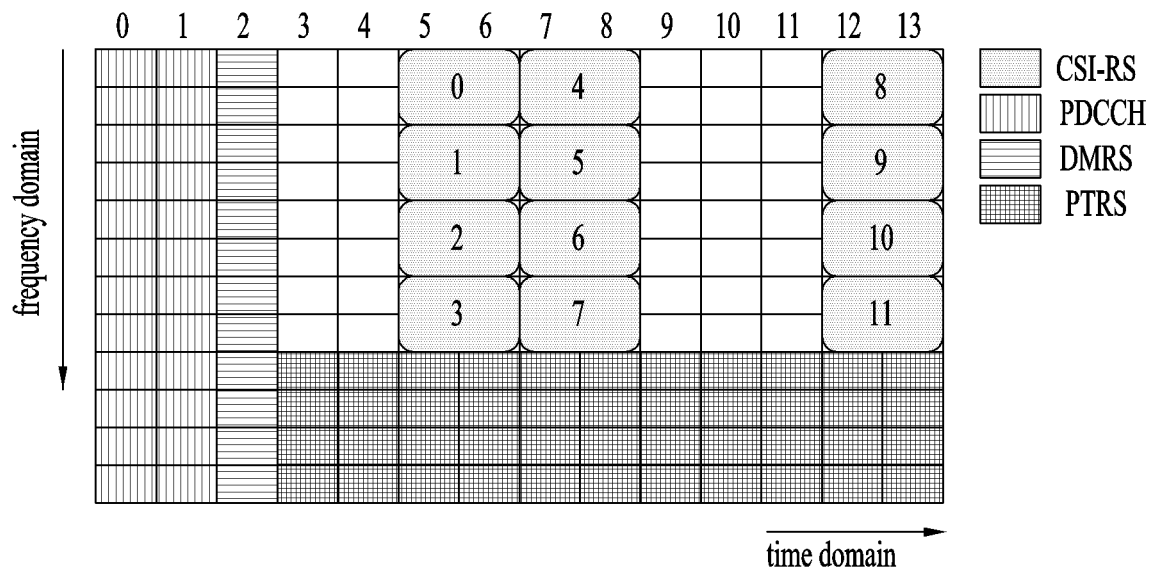
FIGS. 21 and 22 are diagrams schematically illustrating examples of CSI-RS and PT-RS mapping patterns applicable to the present invention.
Figure 22:
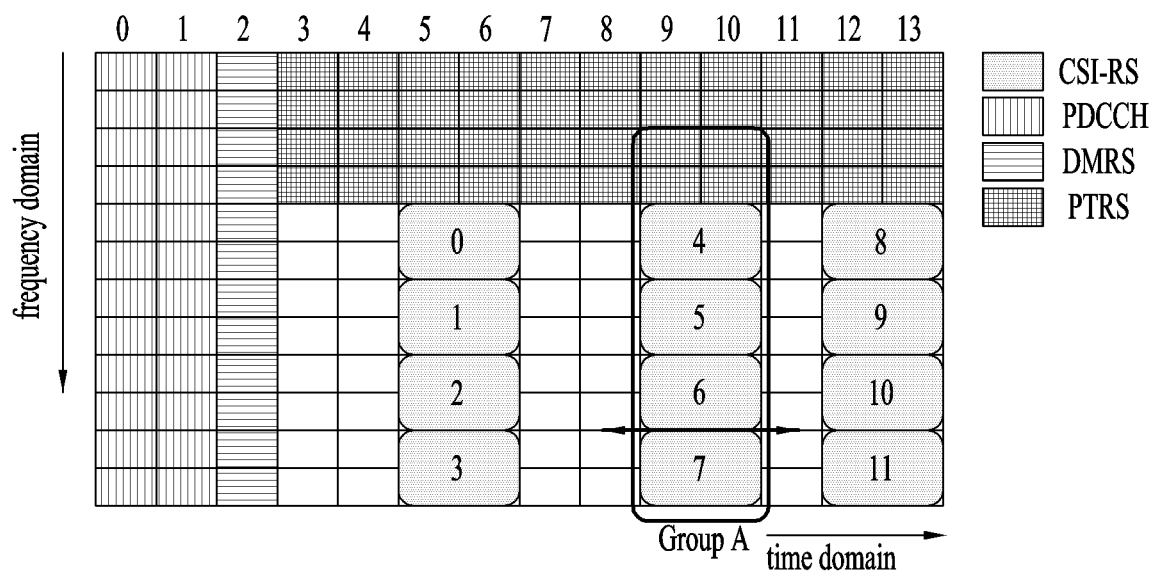

FIGS. 21 and 22 are diagrams schematically illustrating examples of CSI-RS and PT-RS mapping patterns applicable to the present invention.

To avoid collision between a PT-RS and a CSI-RS, the PT-RS can be mapped such that it is FDMed with the CSI-RS as shown in FIGS. 21 and 22.

However, to minimize CSI-RS collision between different TRPs, each TRP may transmit its CSI-RS at different resource locations (cf. FIGS. 21 and 22).

Accordingly, when the CSI-RS mapping location differs per TRP/cell/gNB, the potential PT-RS resource location should also be changed. Thus, the eNB can inform the UE of the potential PT-RS location, and such information can be transmitted through DCI and/or higher layer signaling (e.g., RRC/MAC-CE).

For example, the potential PT-RS location can be configured as follows to simply the CSI-RS location and relevant signaling.

First, the UE may receive one among a plurality of predefined PT-RS (resource) locations through DCI and/or higher layer signaling (e.g., RRC/MAC-CE). In addition, the UE may perform PT-RS transmission and reception at the configured resource location.

(1) DM-RS Configuration 1

Figure 23:
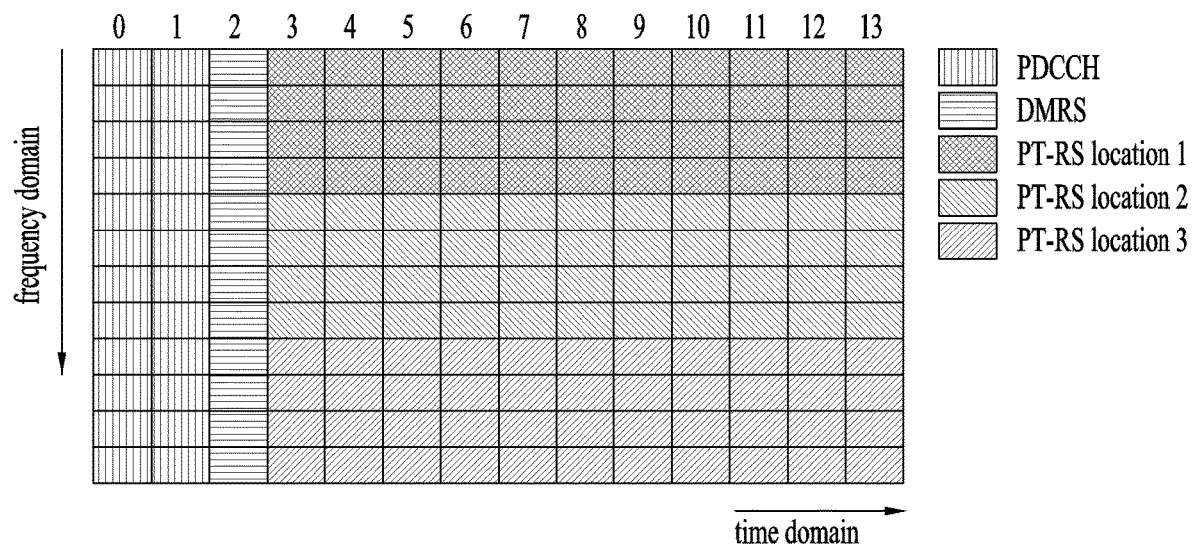
FIG. 23 is a diagram schematically illustrating potential PT-RS resource locations applicable to the present invention.

FIG. 23 is a diagram schematically illustrating potential PT-RS resource locations applicable to the present invention.

In the case of DM-RS configuration 1, three potential PT-RS resource locations (PT-RS locations 1/2/3) can be defined as shown in FIG. 23. In this case, the eNB may configure one of the three resource locations for the UE.

Alternatively, some of the potential PT-RS resource locations shown in in FIG. 23 may defined. For example, only PT-RS locations 1 and 2 may be defined. In this case, the eNB may inform the UE of the PT-RS resource locations through 1-bit information.

(2) DM-RS Configuration 2

Figure 24:
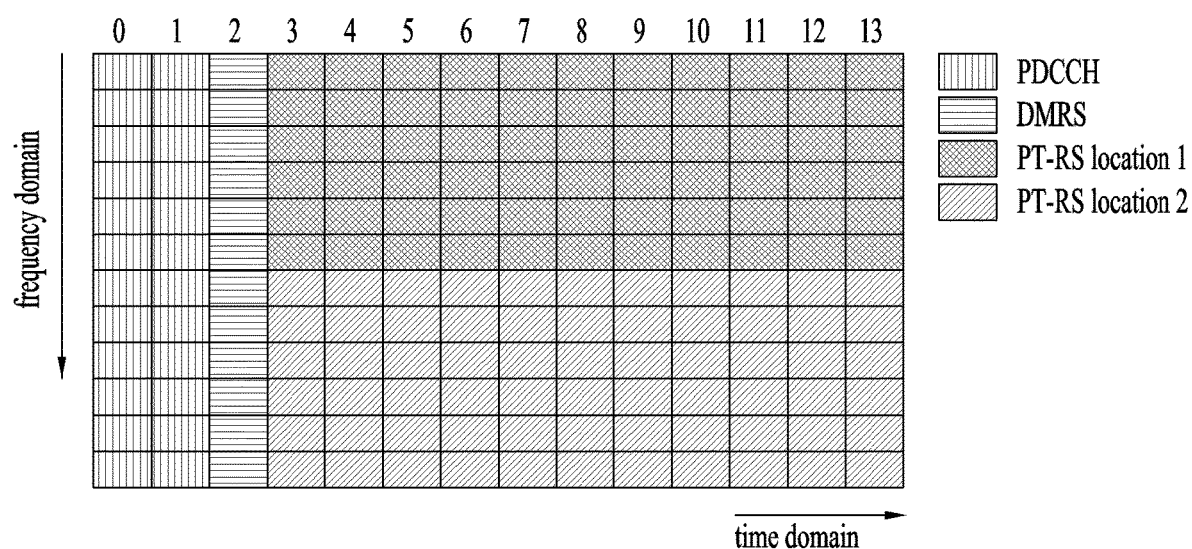
FIG. 24 is a diagram schematically illustrating potential PT-RS resource locations applicable to the present invention.

FIG. 24 is a diagram schematically illustrating potential PT-RS resource locations applicable to the present invention.

In the case of DM-RS configuration 2, two potential PT-RS resource locations (PT-RS locations 1/2) can be defined as shown in FIG. 24. In this case, the eNB may configure one of the two resource locations for the UE.

In these configurations, whether the eNB or UE transmits the PT-RS can be determined based on the MCS and/or scheduled BW. In this case, when the PT-RS is not transmitted, data may be transmitted in the corresponding resource region. That is, since the PT-RS may not be transmitted at the aforementioned resource locations, these locations can be called the potential PT-RS resource locations.

Figure 25:
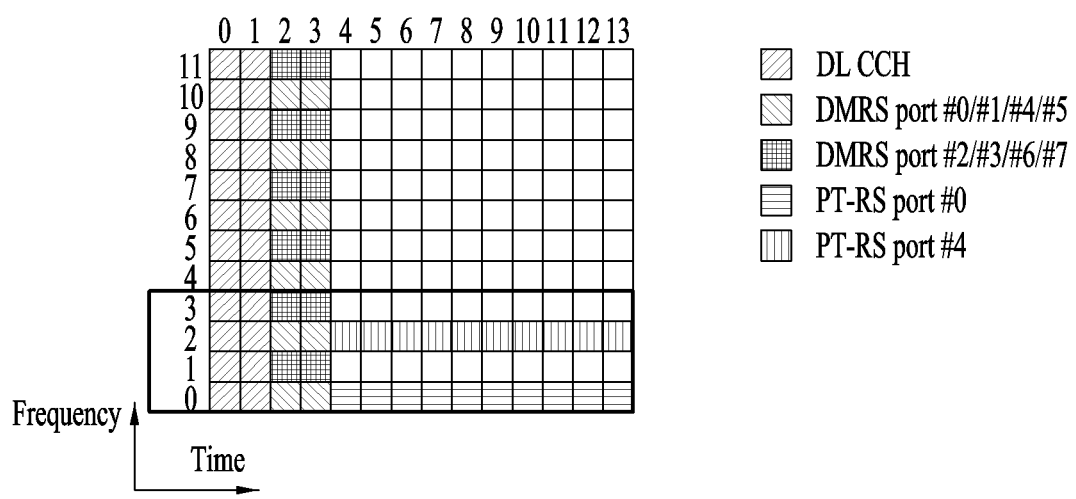
FIG. 25 is a diagram for illustrating a method by which a UE determines the locations where PT-RS ports will be mapped when the potential resource locations of a specific PT-RS are indicated.

FIG. 25 is a diagram for illustrating a method by which a UE determines the locations where PT-RS ports will be mapped when the potential resource locations of a specific PT-RS are indicated.

In FIG. 25, the UE assumes that PT-RS location 3 shown in FIG. 23 has been configured. In this case, the UE may determine subcarriers for DM-RS port #0 to which PT-RS ports will be mapped in the configured PT-RS region (e.g., PT-RS location 3).

In this case, the PT-RS and DM-RS ports should be located at the same subcarrier locations, subcarrier #0 or #2 may be selected as the subcarrier locations corresponding to the PT-RS ports. In this case, the UE may accurately determine the subcarrier locations where the PT-RS ports will be mapped according to the method described in section 3.3.

3.5. Fifth Proposal (Enhanced PT-RS Port Multiplexing for Time CDMed DMRS Ports)

According to the NR system to which the present invention is applicable, in the case of DM-RS configuration 1, when the PT-RS is transmitted, only DM-RS ports #1000 to #1003 can be activated. In other words, in this case, DM-RS ports #1004 to #1007 can be deactivated.

Accordingly, the following table can be defined. In this case, UL-PTRS-RE-offset in the following table can be used for indicating the above-described potential PT-RS resource locations.

TABLE 9

$k_{ref}^{RE}$

| DM-RS antenna port p | DM-RS Configuration type 1 UL-PTRS-RE-offset | | | | DM-RS Configuration type 2 UL-PTRS-RE-offset | | | |
|---|---|---|---|---|---|---|---|---|
| | 00 | 01 | 10 | 11 | 00 | 01 | 10 | 11 |
| 1000 | 0 | 2 | 6 | 8 | 0 | 1 | 6 | 7 |
| 1001 | 2 | 4 | 8 | 10 | 1 | 6 | 7 | 0 |
| 1002 | 1 | 3 | 7 | 9 | 2 | 3 | 8 | 9 |
| 1003 | 3 | 5 | 9 | 11 | 3 | 8 | 9 | 2 |
| 1004 | — | — | — | — | 4 | 5 | 10 | 11 |
| 1005 | — | — | — | — | 5 | 10 | 11 | 4 |

Additionally, in the NR system to which the present invention is applicable, DM-RS ports #1004 to #1007 where the PT-RS is configured can also be activated even in the case of DM-RS configuration 1.

If DM-RS ports #1004 to #1007 are associated with PT-RS ports, the frequency resource locations of the corresponding PT-RS ports may overlap with those of the PT-RS ports allocated for DM-RS ports #1000 to #1003.

Accordingly, a particular method for determining the frequency resource locations of the PT-RS ports associated with DM-RS ports #1004 to #1007 (for DMRS configuration type I) or DM-RS ports #1006 to #1011 (for DMRS configuration type II) will be described in detail hereinafter.

Although the present invention describes the proposed configuration based on DM-RS configuration type 1, the corresponding configuration can be equally applied to DM-RS configuration type 2.

However, in the case of DM-RS configuration type 1, DM-RS ports #1000 to #1003 and DM-RS ports #1004 to #1007 may be in the CDM-T relationship. On the other hand, in the case of DM-RS configuration type 2, DM-RS ports #1000 to #1005 and DM-RS ports #1006 to #10011 may be in the CDM-T relationship.

According to the present invention, the PT-RS ports, which are associated with the DM-RS ports in the CDM-T relationship, can be mapped to (or located at) different RBs.

For example, it is assumed that the PT-RS density is one every two RBs (1/2) and RBs #0 to #5 are allocated for a UE. In this case, if the PT-RS port associated with DM-RS port #1000 is located in the first, third, and fifth RBs, the PT-RS port associated with DM-RS port #1004 may be located in the second, fourth, and sixth RBs.

In addition, the RB locations of the PT-RS ports associated with the DM-RS ports in the CDM-T relationship can be determined according to the following equation. In the following equation, $n_{RNTI}$, $K_{PTRS}$, $N_{RB}$ respectively indicate a C-RNTI (cell radio network temporary identifier) (or UE ID), information indicating the PT-RS frequency density (e.g., in the case of 2, the PT-RS frequency density is 1/2, and in the case of 4, the PT-RS frequency density is 1/4), and the number of allocated RBs, respectively.

$$k_{ref}^{RB} = \begin{cases} \mod(n_{RNTI}, K_{PTRS}) & \text{if } \alpha = 0 \\ \mod(n_{RNTI}, \alpha) & \text{otherwise} \end{cases} \text{ where}$$

[Equation 7]

$\alpha = \mod(N_{RB}, K_{PTRS})$ (1) DMRS Port Configuration Type 1

The RB locations of the PT-RS ports associated with DM-RS ports #1000 to #1003 can be determined according to the following equation. In the following equation, $N_{sc}^{RB}$ indicates a resource block size in the frequency domain, i.e., the number of subcarriers in a corresponding resource block.

$$k=k_{ref}^{RE}+(iK_{PTRS}+k_{ref}^{RB})N_{sc}^{RB} \quad \text{[Equation 8]}$$

The RB locations of the PT-RS ports associated with DM-RS ports #1004 to #1007 can be determined according to the following equation.

$$k=k_{ref}^{RE}+(iK_{PTRS}+\mod(k_{ref}^{RB}\beta,K_{PTRS}))N_{sc}^{RB} \quad \text{[Equation 9]}$$

where β=1

In Equation 9, β may be set to other values except 0 instead of 1. In the case, the value of β may be configured through higher layer signaling. Alternatively, β may have a different value depending on the value of $K_{PTRS}$. For example, the following relationship can be established: β=1 for $K_{PTRS}$=2, β=2 for $K_{PTRS}$=4

(2) DM-RS Port Configuration Type 2

The RB locations of the PT-RS ports associated with DM-RS ports #1000 to #1005 can be determined according to the following equation.

$$k=k_{ref}^{RE}+(iK_{PTRS}+k_{ref}^{RB})N_{sc}^{RB} \quad \text{[Equation 10]}$$

The RB locations of the PT-RS ports associated with DM-RS ports #1006 to #1011 can be determined according to the following equation.

$$k=k_{ref}^{RE}+(iK_{PTRS}+\mod(k_{ref}^{RB}\beta,K_{PTRS}))N_{sc}^{RB} \quad \text{[Equation 11]}$$

where β=1

In Equation 11, β may be set to other values except 0 instead of 1. In the case, the value of β may be configured through higher layer signaling. Alternatively, β may have a different value depending on the value of $K_{PTRS}$. For example, the following relationship can be established: β=1 for $K_{PTRS}$=2, β=2 for $K_{PTRS}$=4.

Figure 26:
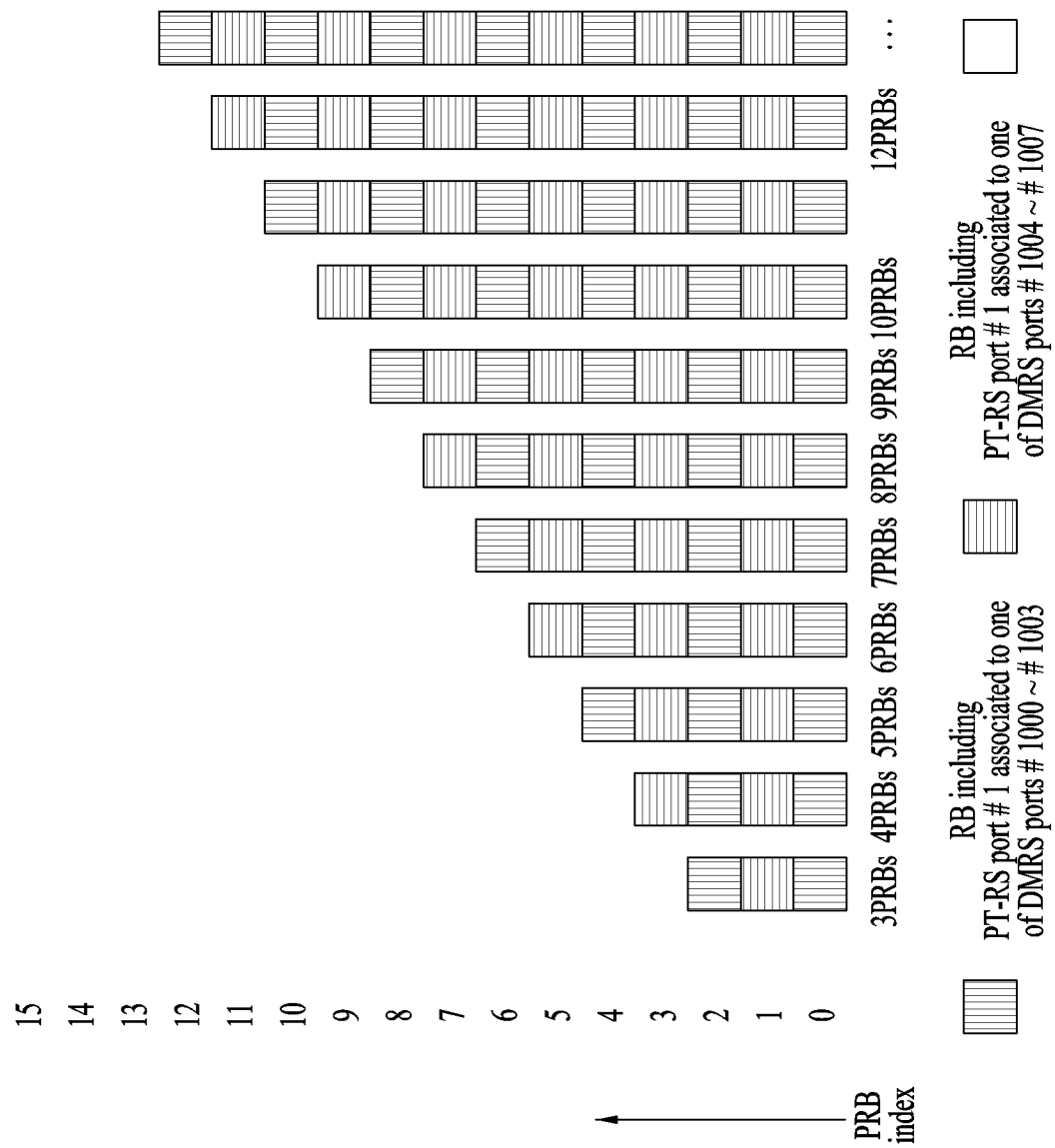
FIG. 26 is a diagram schematically illustrating PT-RS mapping patterns according to an embodiment of the present invention.

FIG. 26 is a diagram schematically illustrating PT-RS mapping patterns according to an embodiment of the present invention.

In FIG. 26, the following relationship can be established: $n_{RNTI}$=2, $K_{PTRS}$=2 And, DM-RS configuration type 1 is assumed.

However, when the number of RBs is one, the UE may not expect that PT-RS ports are associated with one of DM-RS ports #1004 to #1007.

Figure 27:
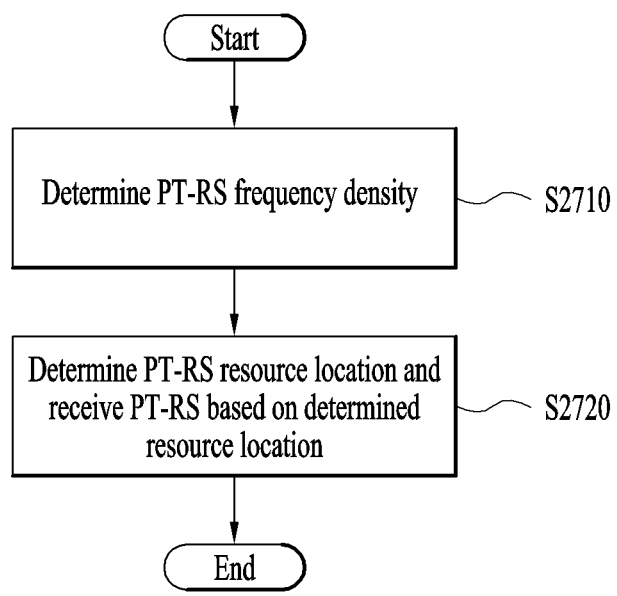
FIG. 27 is a flowchart schematically illustrating a method by which a UE receives a PT-RS according to an embodiment of the present invention.

FIG. 27 is a flowchart schematically illustrating a method by which a UE receives a PT-RS according to an embodiment of the present invention.

First, the UE determines the frequency density of the PT-RS based on the bandwidth allocated for the UE [S2710].

According to the present invention, the PT-RS frequency density can be determined as follows:

One PT-RS every two resource blocks; and

One PT-RS every four resource blocks.

Thereafter, the UE determines the frequency location of the PT-RS and then receives the PT-RS at the determined resource location [S2720].

Specifically, the UE may receive the PT-RS on a resource block that is determined based on new resource block indices for all resource blocks, which are allocated to the UE, and the determined PT-RS frequency density.

In this case, the new resource block indices for all resource blocks allocated to the UE may mean virtual resource block indices for all resource blocks allocated to the UE. In this case, the virtual resource block indices may be numbered in the same order as that of indices of all resource blocks allocated to the UE.

In this case, the UE may receive information indicating one or a plurality of subcarriers where the PT-RS can be mapped in the resource block to which the PT-RS is mapped.

Accordingly, the UE may determine the location of at least one subcarriers where the PT-RS is mapped among the one or plurality of subcarriers based on the frequency location of a demodulation reference signal (DM-RS) port associated with the PT-RS.

This information may be received through higher layer signaling.

The PT-RS may be mapped to at least one symbol after a symbol to which the associated DM-RS port is mapped within the at least one subcarrier to which the PT-RS is mapped and then received.

In this case, a time-domain pattern for mapping the PT-RS to the at least one symbol may be determined based on a modulation and coding scheme (MCS) scheduled to the UE.

In addition, when PT-RSs are received through two PT-RS ports (or defined for the two PT-RS ports), if the two PT-RS ports are respectively associated with a plurality of DM-RS ports, which are code division multiplexed in the time domain (CDM-T), the PT-RSs passing through the two PT-RS ports may be mapped to different resource blocks for reception thereof.

In detail, the association between PT-RS and DM-RS ports applicable to the present invention can be established according to the following methods.

(1) A case in which one DM-RS port group is defined

In this case, one PT-RS port can be defined.

For example, in the case of one codeword, the PT-RS port may be associated with (or mapped to) the DM-RS port having the lowest index in the DM-RS port group.

As another example, in the case of two codewords, the PT-RS port may be associated with (or mapped to) the DM-RS port with the lowest index among DM-RS ports belonging to the CW with a higher MCS.

(2) A case in which two DM-RS port groups are defined

In this case, two PT-RS ports can be defined.

At this time, a PT-RS may be transmitted in each DM-RS port group. In this case, each PT-RS port may be associated with (or mapped to) the DM-RS port with the lowest index in each DM-RS port group.

Alternatively, one PT-RS port can be defined.

In this case, the PT-RS port may be associated with (or mapped to) the DM-RS port with the lowest index among DM-RS ports belonging to the CW with a higher MCS.

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from the eNB to the UE through a predefined signal (e.g., physical layer signal, higher layer signal, etc.).

4. Device Configuration

Figure 28:
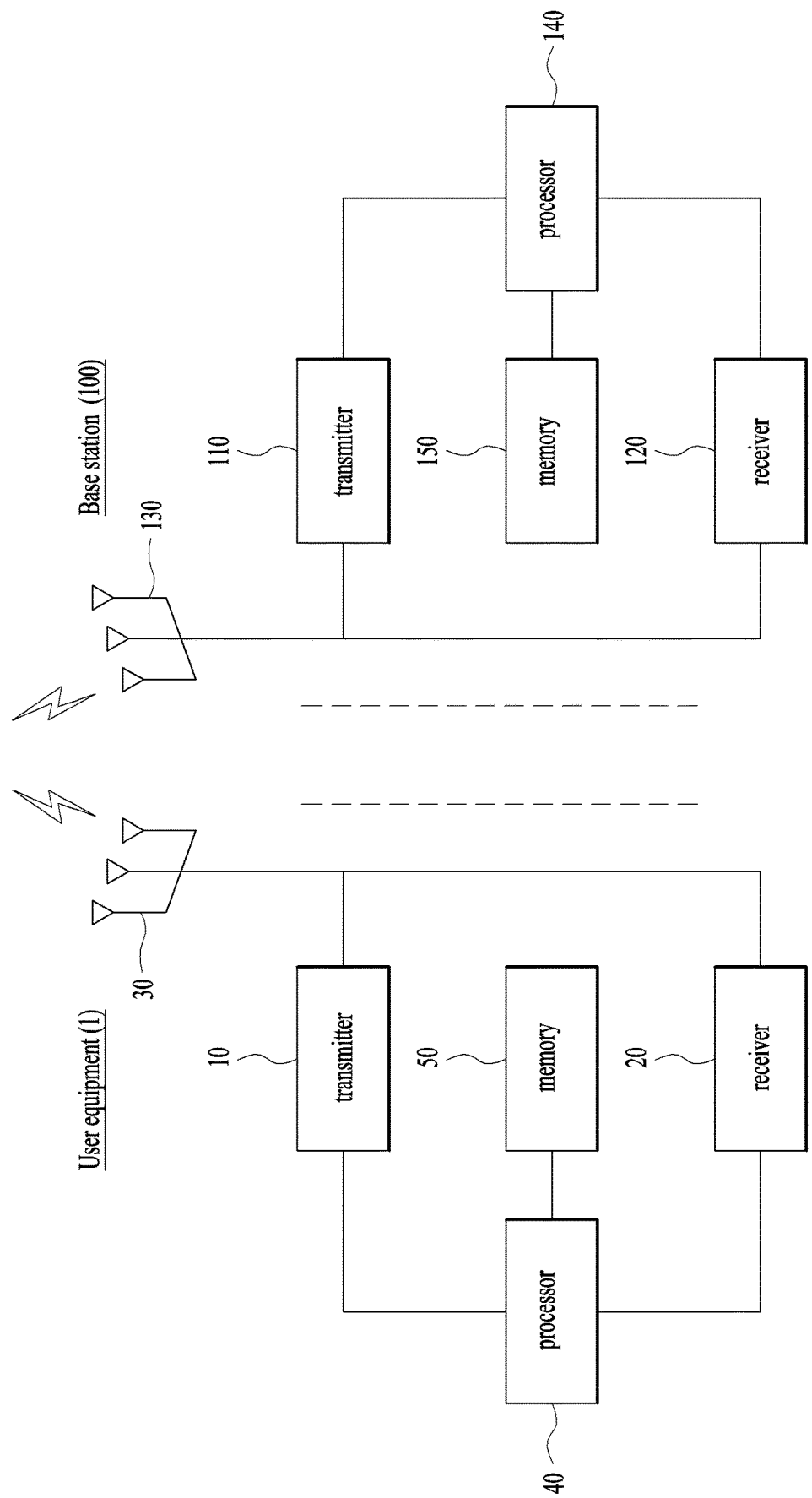
FIG. 28 is a diagram illustrating the configuration of a user equipment and a base station for implementing the proposed embodiments.

FIG. 28 is a diagram illustrating configurations of a UE and a base station capable of being implemented by the embodiments proposed in the present invention. The UE and the base station shown in FIG. 28 operate to implement the embodiments for a method of transmitting and receiving a phase tracking reference signal between the base station and the UE.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

With the above-described configuration, the UE 1 determines the frequency density of a PT-RS based on the bandwidth allocated to the UE. Thereafter, the UE 1 receive the PT-RS on a resource block that is determined based on new resource block indices for all resource blocks, which are allocated to the UE, and the determined PT-RS frequency density.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 28 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of receiving, by a user equipment (UE), a phase tracking reference signal (PT-RS) in a wireless communication system, the method comprising:
   determining, among a plurality of resource blocks that are sequentially numbered according to first indices, N resource blocks that are allocated to the UE, wherein the N resource blocks are sequentially numbered from 0 to N−1 according to second indices that are different from the first indices, where N is a natural number;
   determining, among the N resource blocks allocated to the UE, one or more resource blocks having subcarriers to which the PT-RS is mapped; and
   receiving the PT-RS via the one or more resource blocks,
   wherein determining the one or more resource blocks having subcarriers to which the PT-RS is mapped is based on (i) a first value related to a frequency density of the PT-RS, and (ii) a second value related to a resource block offset,
   wherein the first value is related to a scheduled bandwidth for the N resource blocks allocated to the UE, and
   wherein determining the one or more resource blocks having subcarriers to which the PT-RS is mapped comprises:
      determining the one or more resource blocks as being spaced apart from each other by the first value according to the second indices, and
      determining an offset for a lowest scheduled resource block among the one or more resource blocks based on the second value.

2. The method of claim 1, wherein the frequency density of the PT-RS is equal to either one PT-RS every two resource blocks or one PT-RS every four resource blocks.

3. The method of claim 1, further comprising receiving information related to one or more subcarrier candidates, in the one or more resource blocks, to which the PT-RS can be mapped.

4. The method of claim 3, further comprising:
   determining a location of the subcarriers to which the PT-RS is mapped, among the one or more subcarrier candidates, based on a frequency location of a demodulation reference signal (DM-RS) port associated with the PT-RS.

5. The method of claim 4, wherein the PT-RS is mapped to at least one symbol that is subsequent to a symbol to which the associated DM-RS port is mapped within the subcarriers to which the PT-RS is mapped.

6. The method of claim 5, wherein a time-domain pattern for mapping the PT-RS to the at least one symbol is based on a modulation and coding scheme (MCS) scheduled to the UE.

7. The method of claim 3, wherein the information related to one or more subcarrier candidates is received through higher layer signaling.

8. The method of claim 1, wherein based on a plurality of PT-RSs being received through two PT-RS ports, and based on the two PT-RS ports being respectively associated with a plurality of demodulation reference signal (DM-RS) ports which are code division multiplexed in a time domain (CDM-T):

each of the plurality of PT-RSs received through the two PT-RS ports are mapped to different resource blocks.

9. The method of claim 1, wherein determining the one or more resource blocks having subcarriers to which the PT-RS is mapped further comprises: determining, among the second indices, one or more second indices i that correspond to the one or more resource blocks according to: i=k*(first value)+(second value), where k=0, 1, . . . n.

10. A user equipment (UE) configured to receive a phase tracking reference signal (PT-RS) in a wireless communication system, the UE comprising:

at least one transceiver;
at least one processor; and
at least one computer memory operably connectable to the at least one processor and storing instructions that, when executed, cause the at least one processor to perform operations comprising:
determining, among a plurality of resource blocks that are sequentially numbered according to first indices, N resource blocks that are allocated to the UE, wherein the N resource blocks are sequentially numbered from 0 to N−1 according to second indices that are different from the first indices, where N is a natural number;
determining, among the N resource blocks allocated to the UE, one or more resource blocks having subcarriers to which the PT-RS is mapped; and
receiving, through the at least one transceiver, the PT-RS via the one or more resource blocks,
wherein determining the one or more resource blocks having subcarriers to which the PT-RS is mapped is based on (i) a first value related to a frequency density of the PT-RS, and (ii) a second value related to a resource block offset,
wherein the first value is related to a scheduled bandwidth for the N resource blocks allocated to the UE, and
wherein determining the one or more resource blocks having subcarriers to which the PT-RS is mapped comprises:
determining the one or more resource blocks as being spaced apart from each other by the first value according to the second indices, and
determining an offset for a lowest scheduled resource block among the one or more resource blocks based on the second value.

11. The UE of claim 10, wherein the frequency density of the PT-RS is equal to either one PT-RS every two resource blocks or one PT-RS every four resource blocks.

12. The UE of claim 10, wherein the operations further comprise:
receiving, through the at least one transceiver, information related to one or more subcarrier candidates, in the one or more resource blocks, to which the PT-RS can be mapped.

13. The UE of claim 12, wherein the operations further comprise:
determining a location of the subcarriers to which the PT-RS is mapped, among the one or more subcarrier candidates, based on a frequency location of a demodulation reference signal (DM-RS) port associated with the PT-RS.

14. The UE of claim 13, wherein the PT-RS is mapped to at least one symbol that is subsequent to a symbol to which the associated DM-RS port is mapped within the subcarriers to which the PT-RS is mapped.

15. The UE of claim 14, wherein a time-domain pattern for mapping the PT-RS to the at least one symbol is based on a modulation and coding scheme (MCS) scheduled to the UE.

16. The UE of claim 12, wherein the information related to one or more subcarrier candidates is received through higher layer signaling.

17. The UE of claim 10, wherein based on a plurality of PT-RSs being received through two PT-RS ports, and based on the two PT-RS ports being respectively associated with a plurality of demodulation reference signal (DM-RS) ports which are code division multiplexed in a time domain (CDM-T):
each of the plurality of PT-RSs received through the two PT-RS ports are mapped to different resource blocks.

18. The UE of claim 10, wherein determining the one or more resource blocks having subcarriers to which the PT-RS is mapped further comprises: determining, among the second indices, one or more second indices i that correspond to the one or more resource blocks according to: i=k*(first value)+(second value), where k=0, 1, . . . n.

* * * * *